(12) United States Patent
Narimatsu

(10) Patent No.: US 6,590,716 B2
(45) Date of Patent: Jul. 8, 2003

(54) PROJECTION ZOOM LENS

(75) Inventor: Shuji Narimatsu, Nagano-Ken (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 10/128,242

(22) Filed: Apr. 24, 2002

(65) Prior Publication Data
US 2002/0171942 A1 Nov. 21, 2002

(30) Foreign Application Priority Data

Apr. 27, 2001 (JP) ........................................ 2001-132168
Apr. 22, 2002 (JP) ........................................ 2002-119863

(51) Int. Cl.[7] ............................................. G02B 15/14
(52) U.S. Cl. ..................... 359/679; 359/649; 359/680; 359/681; 359/686; 359/715; 359/781
(58) Field of Search .................. 359/649, 650, 359/679, 680, 681, 682, 684, 686, 715, 781

(56) References Cited

U.S. PATENT DOCUMENTS

| | | | |
|---|---|---|---|
| 4,591,235 A | 5/1986 | Tokumaru et al. | 359/686 |
| 4,653,873 A | 3/1987 | Kawamura | 359/686 |
| 5,805,350 A | 9/1998 | Yamamoto | 359/686 |
| 5,914,820 A * | 6/1999 | Takimoto et al. | 359/686 |
| 5,963,377 A | 10/1999 | Okada et al. | 359/686 |
| 6,075,653 A * | 6/2000 | Narimatsu et al. | 359/680 |
| 6,137,638 A * | 10/2000 | Yamagishi et al. | 359/649 |
| 6,222,680 B1 * | 4/2001 | Yamamoto et al. | 359/680 |
| 6,285,509 B1 * | 9/2001 | Nakayama et al. | 359/676 |
| 2001/0050818 A1 * | 12/2001 | Wada et al. | 359/649 |

FOREIGN PATENT DOCUMENTS

| | | |
|---|---|---|
| JP | 05297276 | 11/1993 |
| JP | 9-243917 | 9/1997 |
| JP | 10-168193 | 6/1998 |
| JP | 10-186235 | 7/1998 |
| JP | 11-190821 | 7/1999 |
| JP | 11-231219 | 8/1999 |
| JP | 2000-19400 | 1/2000 |
| JP | 2000-137165 | 5/2000 |
| JP | 2000-206409 | 7/2000 |

* cited by examiner

Primary Examiner—Evelyn A. Lester
(74) Attorney, Agent, or Firm—Oliff & Berridge, PLC

(57) ABSTRACT

A projection zoom lens includes a first lens group having a negative refracting power, a second lens group having a positive refracting power, a third lens group having a negative refracting power, and a fourth lens group having a positive refracting power, which are arranged in that order from a screen side toward an image plane side along an optical axis. The first and the fourth lens group are kept stationary, and the second and the third lens group are moved along the optical axis to vary power from a limit wide angle power toward a limit telephoto power. The second lens group includes a 2nd-group 1st positive lens, a 2nd-group 1st compound lens formed by joining a 2nd-group 2nd positive lens having a convex surface on the image plane side and a 2nd-group 1st negative lens having a concave surface on the screen side, and a 2nd-group 3rd positive lens arranged in that order from the screen side toward the image plane side. The third lens group includes a 3rd-group 1st meniscus lens having a concave surface on the image plane, a 3rd-group 1st compound lens formed by joining a 3rd-group 1st negative lens having opposite concave surfaces and a 3rd-group 1st positive lens having opposite convex surfaces, and a 3rd-group 2nd meniscus lens having a convex surface on the image plane side arranged in that order from the screen side toward the image plane side. The first lens group has a focal length f1, the 2nd-group 1st positive lens and the 2nd-group 1st compound lens have a composite focal length f2AB of a sign opposite to that of the focal length f1, and the focal length f1 and the composite focal length f2AB meet an inequality: $0.5 < |f1/f2AB| < 2.0$.

24 Claims, 19 Drawing Sheets

|  | RDY | THI | GLA |
|---|---:|---:|---|
| OBJ: | INFINITY | 1800.000000 | |
| 1: | 74.49000: | 6.500000 | 1.70200_40.2 |
| 2: | 446.69000: | 0.200000 | |
| 3: | 67.76000: | 1.800000 | 1.58913_61.3 |
| 4: | 25.60000: | 10.300000 | |
| 5: | -102.90000: | 1.500000 | 1.48749_70.4 |
| 6: | 35.37000: | *1 | |
| 7: | 64.69000: | 3.900000 | 1.80610_33.3 |
| 8: | 2195.17000: | 2.600000 | |
| 9: | 64.27000: | 7.000000 | 1.63980_34.6 |
| 10: | -31.48000: | 1.000000 | 1.84666_23.8 |
| 11: | -105.83000: | 9.200000 | |
| 12: | 38.45000: | 4.400000 | 1.74100_52.6 |
| 13: | -97.55000: | *2 | |
| 14: | 410.47000: | 1.800000 | 1.58144_40.9 |
| 15: | 21.53000: | 11.500000 | |
| 16: | -17.14000: | 1.200000 | 1.84666_23.8 |
| 17: | 83.32000: | 8.400000 | 1.49700_81.6 |
| 18: | -23.79000: | 0.200000 | |
| 19: | 3072.58000: | 6.600000 | 1.74330_49.2 |
| 20: | -37.87000: | *3 | |
| 21: | 58.81000: | 6.000000 | 1.80518_25.5 |
| 22: | -399.92000: | 1.000000 | |
| 23: | INFINITY | 35.000000 | 1.51680_64.2 |
| 24: | INFINITY | | |

|  | WIDE | NORMAL | TELE |
|---|---:|---:|---:|
| *1 | 24.84000 | 18.86000 | 13.10000 |
| *2 | 1.10000 | 2.13000 | 3.62000 |
| *3 | 0.60000 | 5.55000 | 9.82000 |

FIG. 2

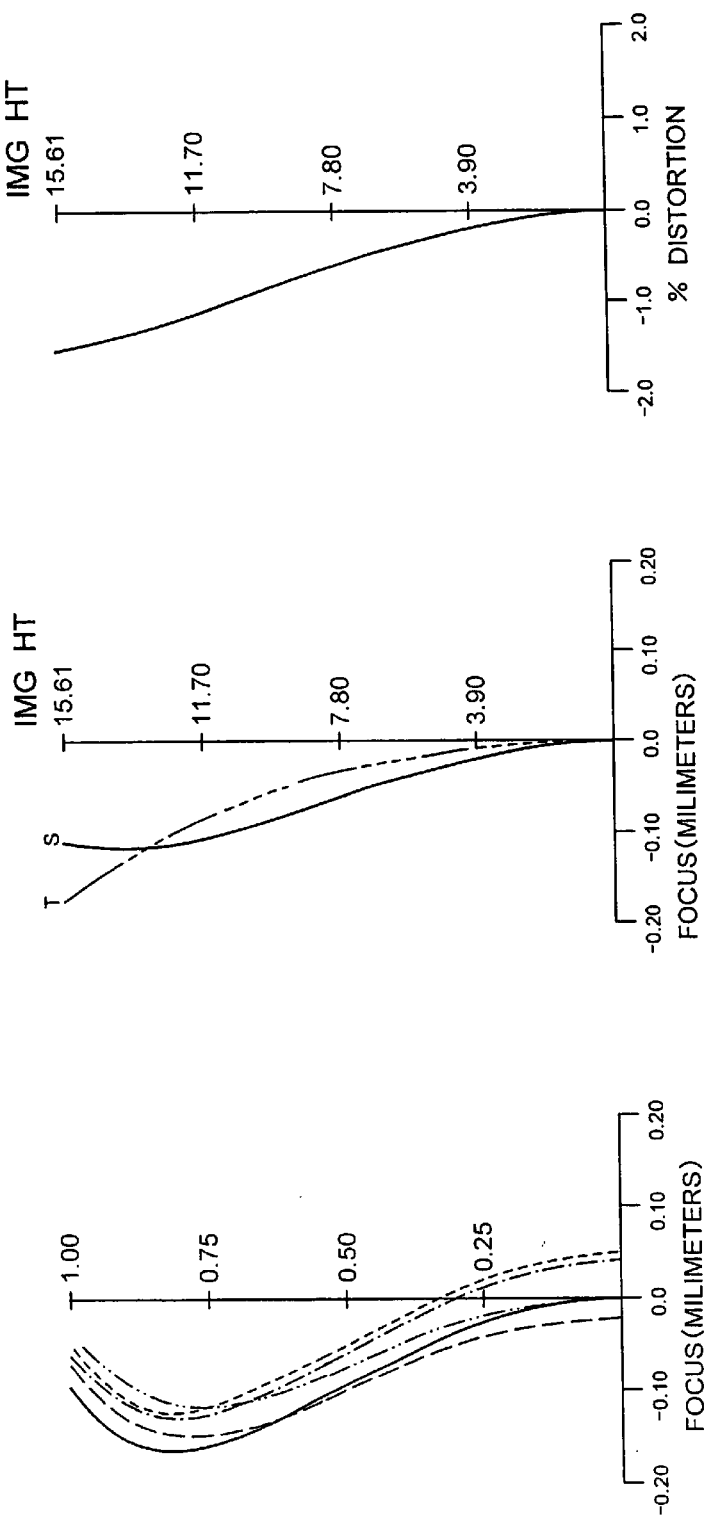

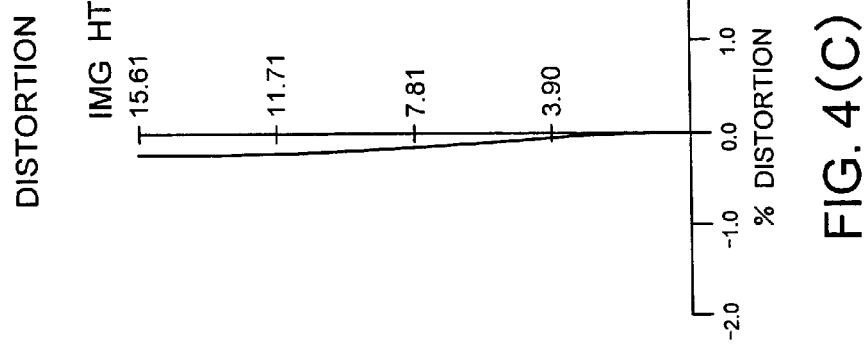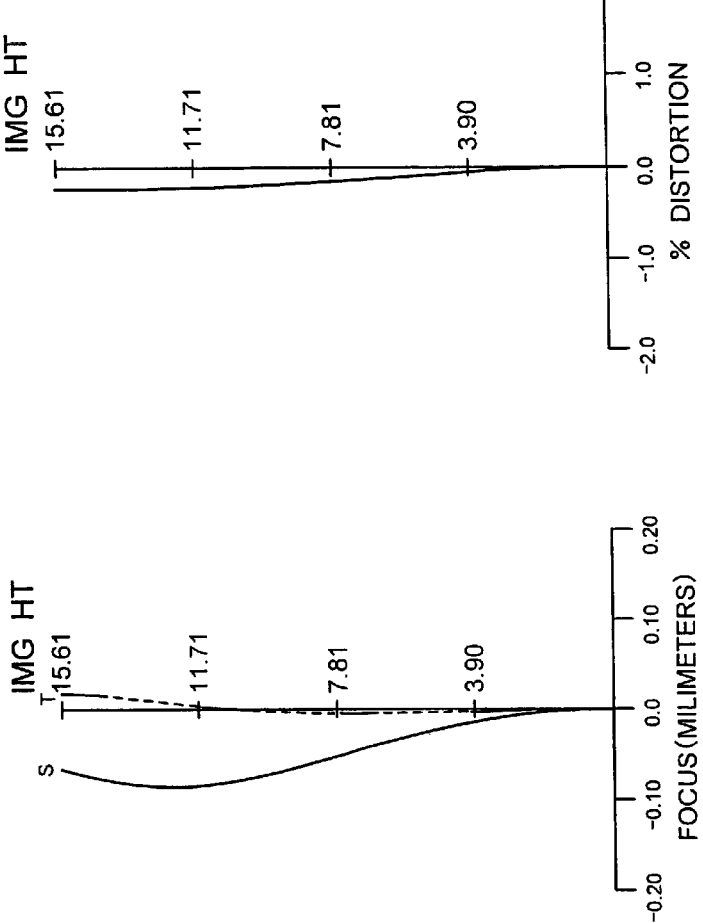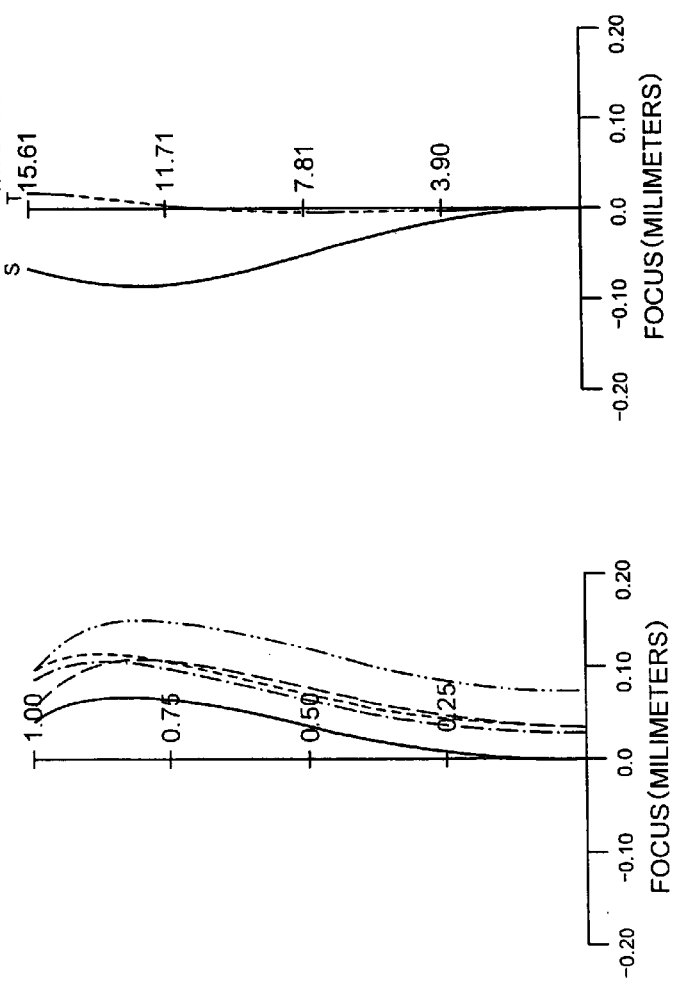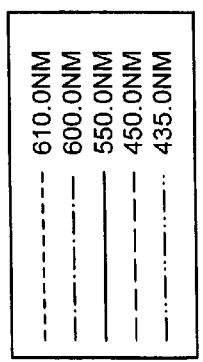
FIG. 4(A)  FIG. 4(B)  FIG. 4(C)

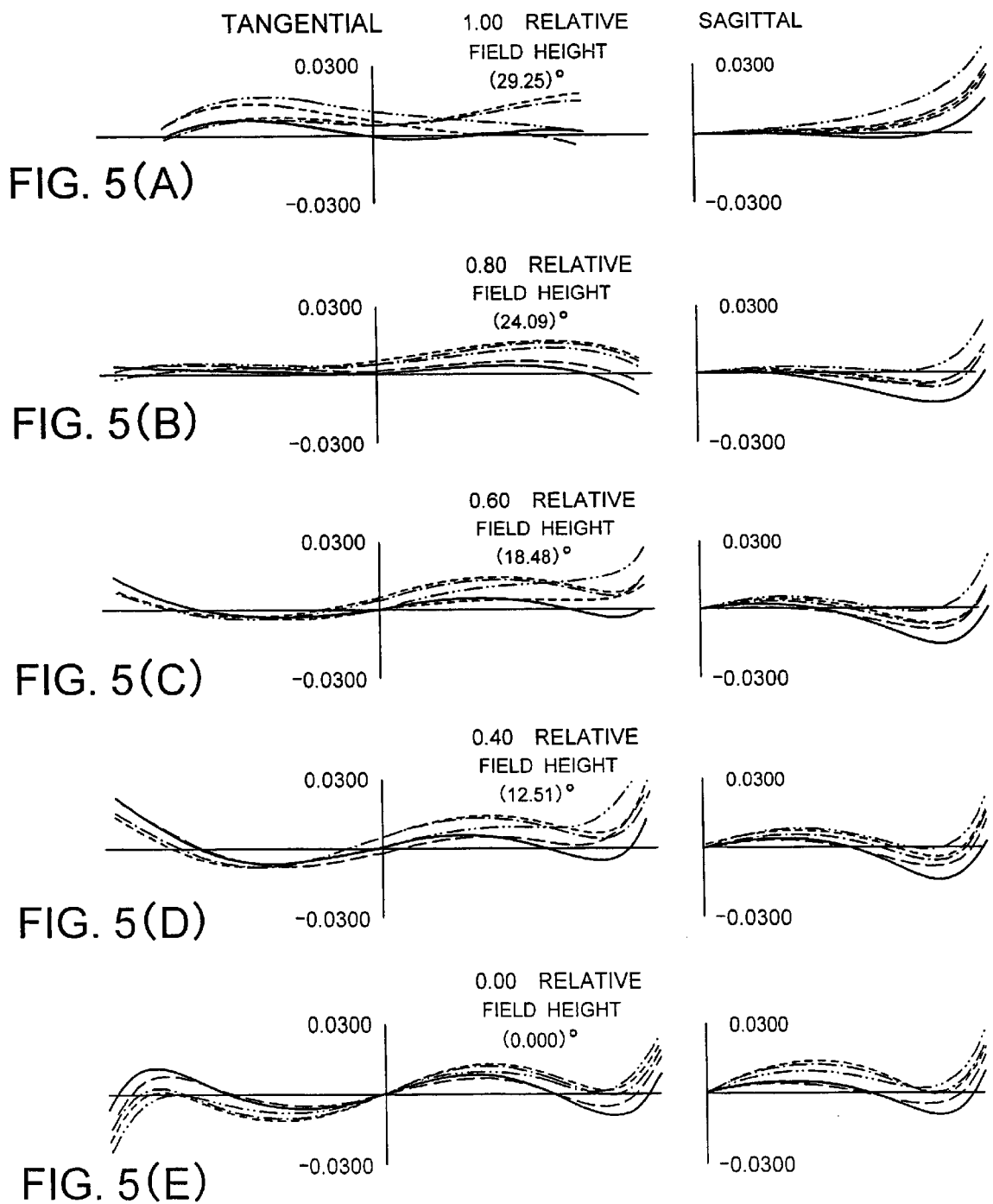

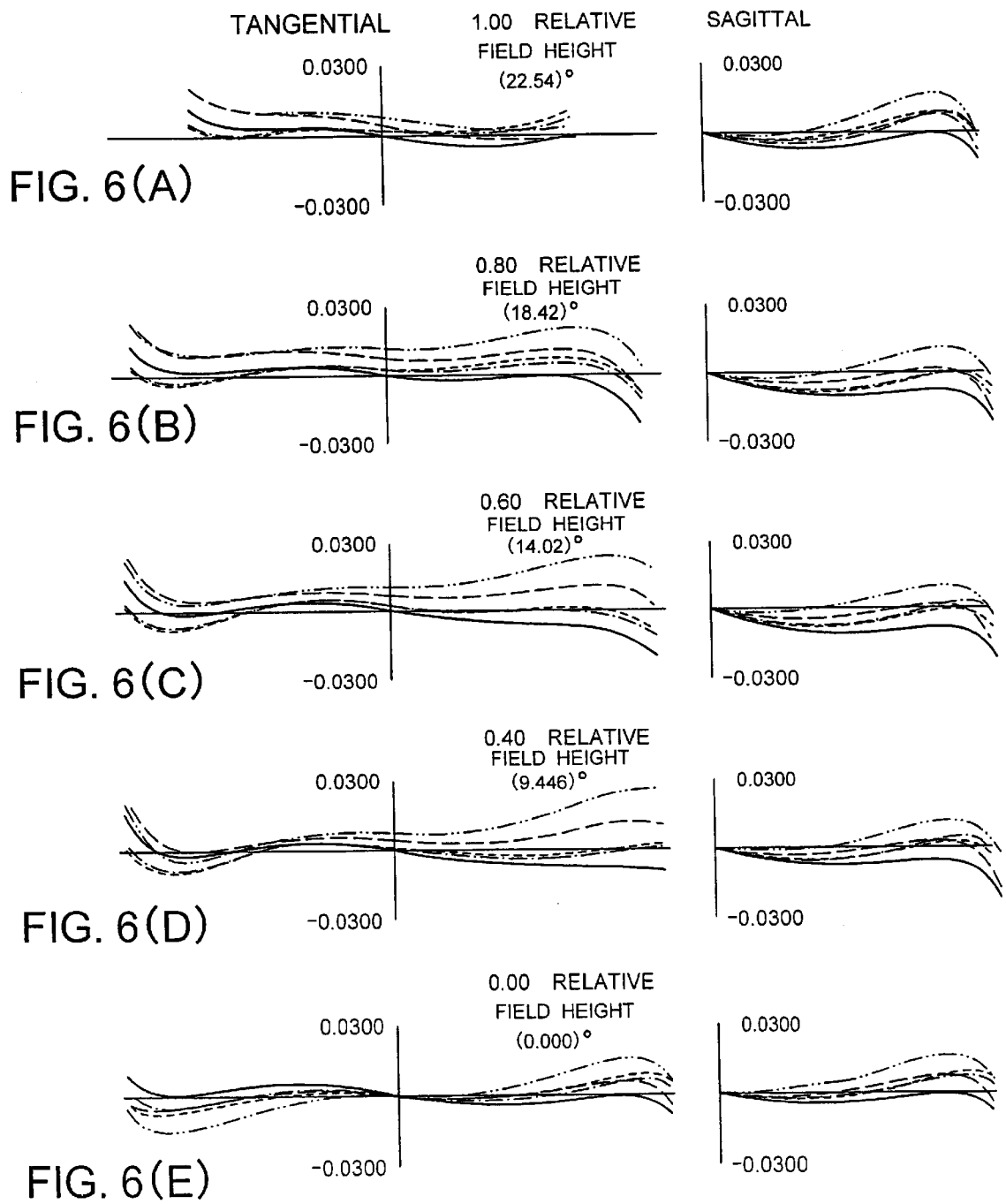

|     | RDY | THI | GLA |
|---|---|---|---|
| OBJ: | INFINITY | 1800.000000 | |
| 1: | 72.59000 | 5.600000 | 1.72342_38.0 |
| 2: | 332.68000 | 0.200000 | |
| 3: | 77.16000 | 1.500000 | 1.62041_60.3 |
| 4: | 26.41000 | 10.250000 | |
| 5: | -84.48000 | 1.200000 | 1.48749_70.4 |
| 6: | 39.46000 | *1 | |
| 7: | 59.99000 | 4.600000 | 1.84666_23.8 |
| 8: | -482.05000 | 2.100000 | |
| 9: | 56.26000 | 7.100000 | 1.51680_64.2 |
| 10: | -36.61000 | 1.000000 | 1.84666_23.8 |
| 11: | -82.61000 | 9.700000 | |
| 12: | 41.98000 | 5.300000 | 1.71300_53.9 |
| 13: | -105.77000 | *2 | |
| 14: | 166.48000 | 2.000000 | 1.68893_31.1 |

ASP:
K:     0.000000
A: 0.702736E-06  B:0.284901E-07  C:-0.213947E-09  D 0.149759E-11

|     | RDY | THI | GLA |
|---|---|---|---|
| 15: | 24.02000 | 8.500000 | |
| 16: | -15.28000 | 1.200000 | 1.84666_23.8 |
| 17: | 55.60000 | 8.800000 | 1.48749_70.4 |
| 18: | -22.01000 | 0.200000 | |
| 19: | 916.44000 | 7.200000 | 1.70154_41.1 |
| 20: | -34.73000 | *3 | |
| 21: | 70.61000 | 6.200000 | 1.80518_25.5 |
| 22: | -154.21000 | 1.000000 | |
| 23: | INFINITY | 35.000000 | 1.51680_64.2 |
| 24: | INFINITY | | |

|     | WIDE | NORMAL | TELE |
|---|---|---|---|
| *1 | 25.40000 | 19.48000 | 14.08000 |
| *2 | 1.40000 | 2.66000 | 4.31000 |
| *3 | 0.60000 | 5.27000 | 9.03000 |

FIG. 8

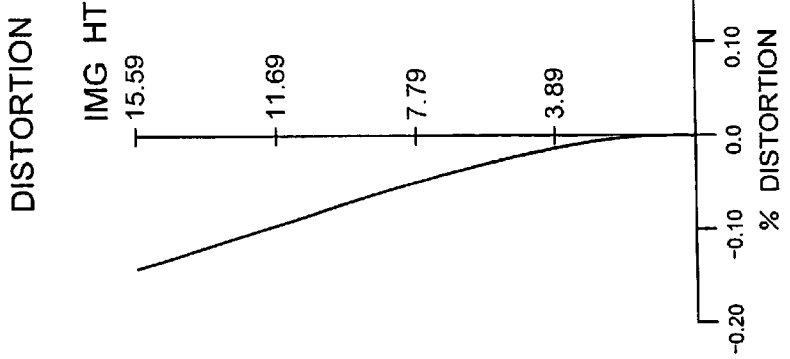
FIG. 9(C)
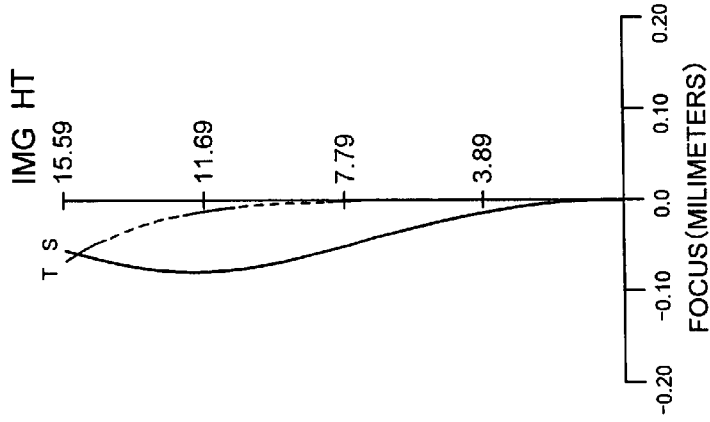
FIG. 9(B)
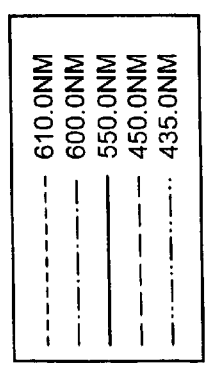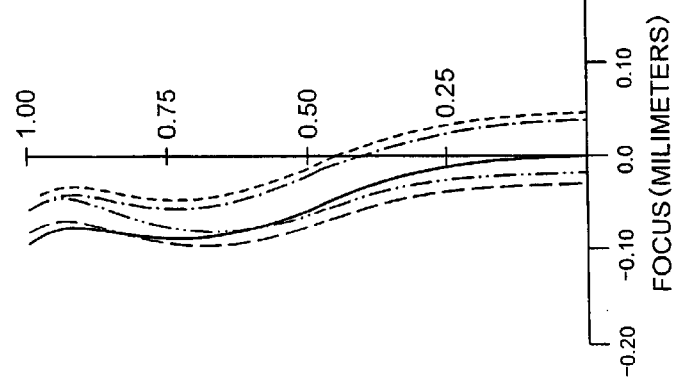
FIG. 9(A)

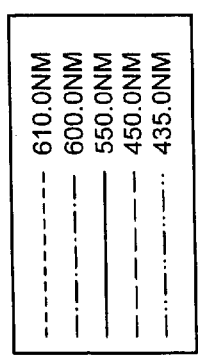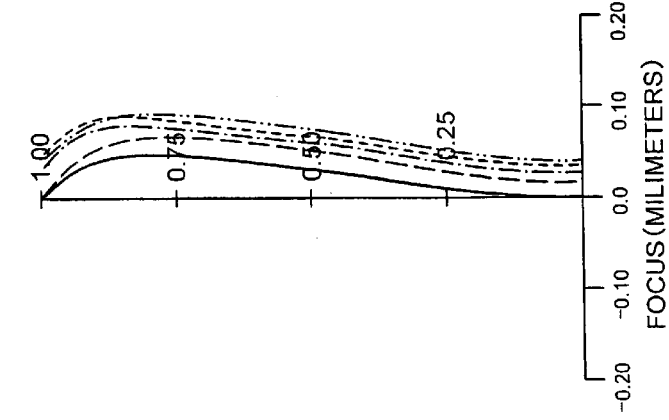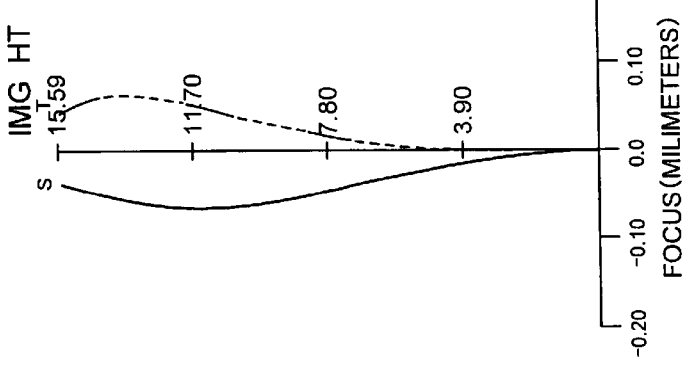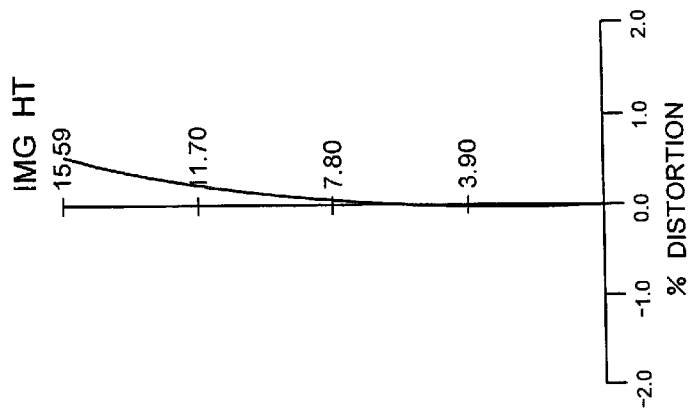

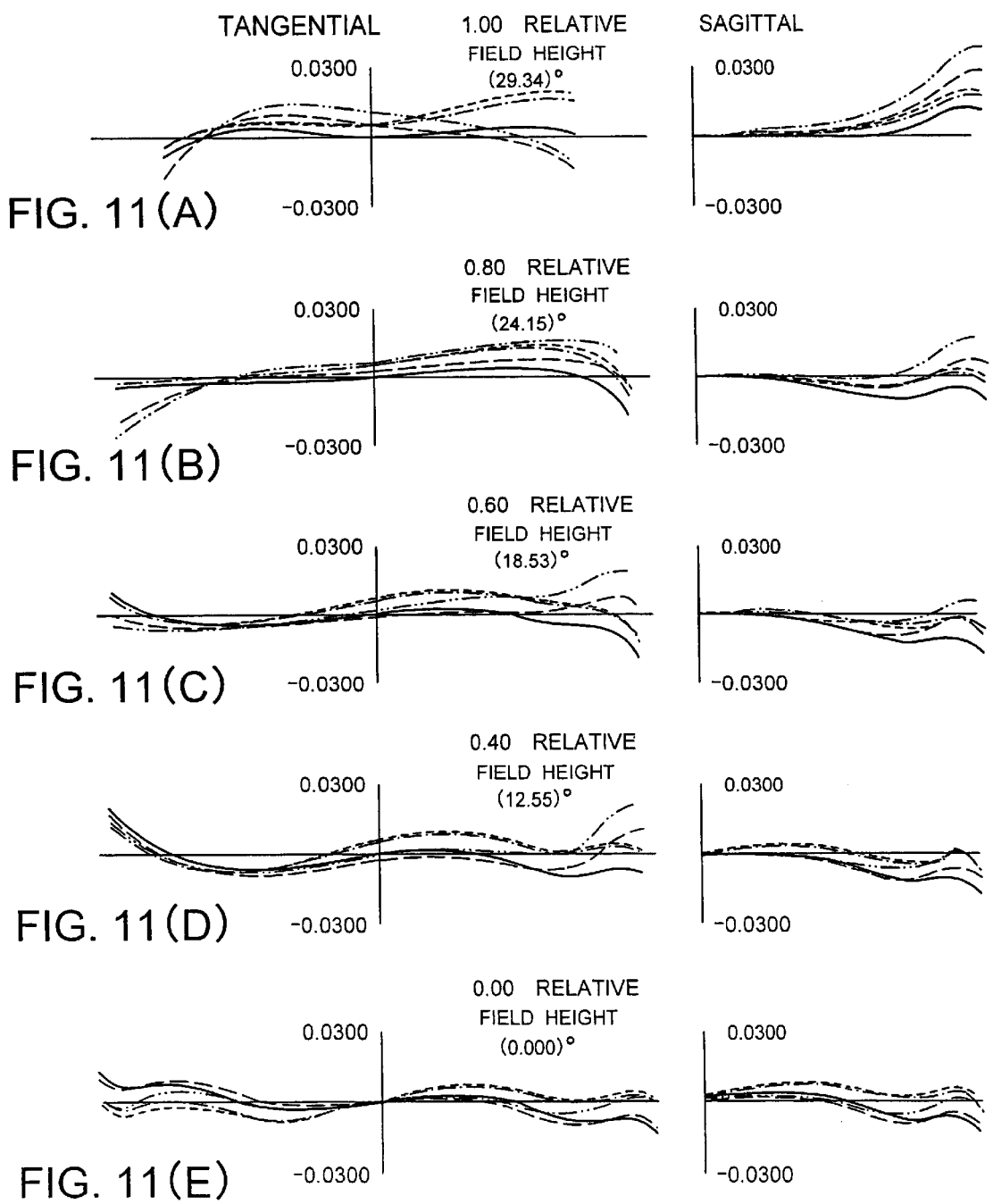

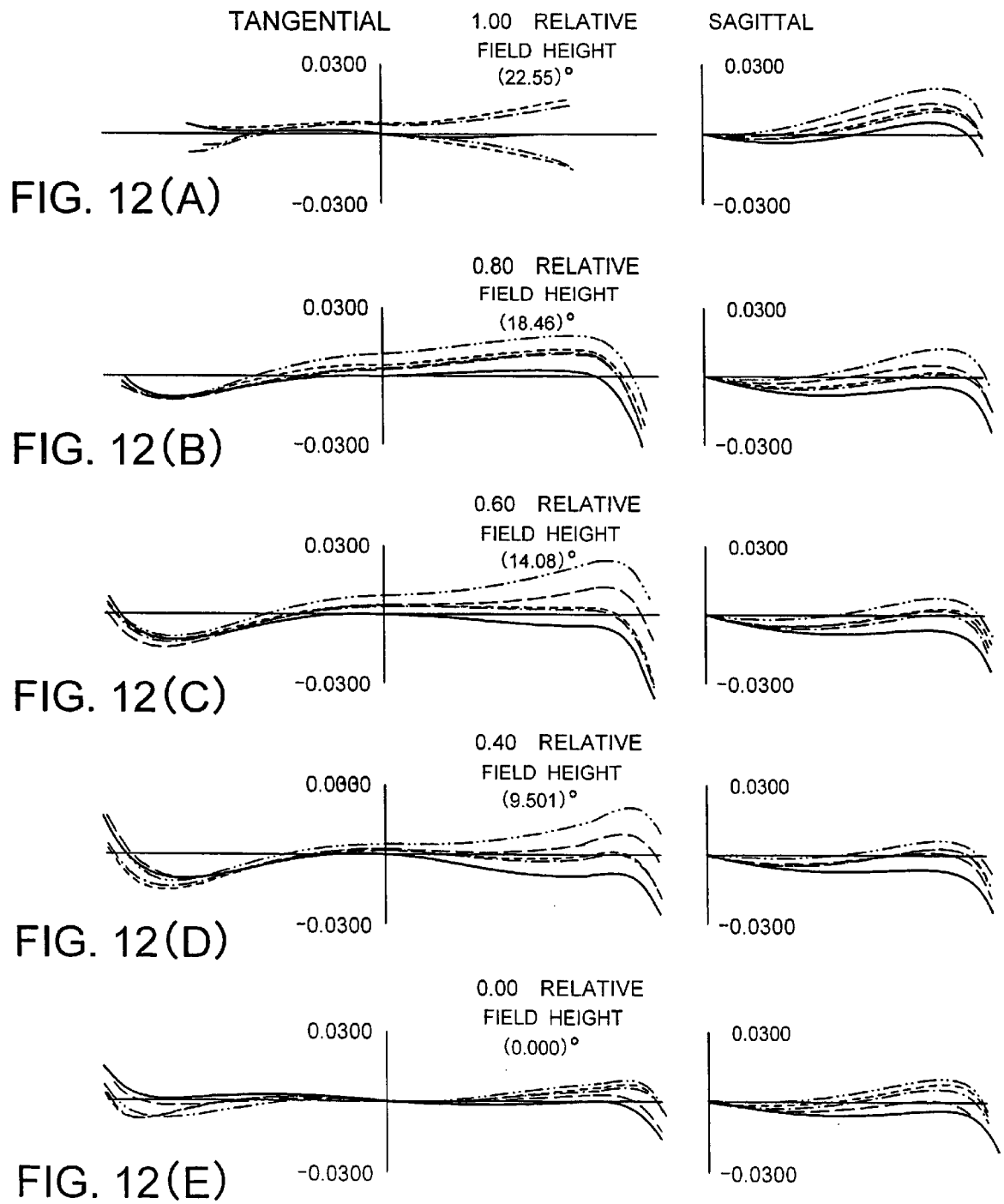

|     | RDY        | THI         | GLA          |
|-----|------------|-------------|--------------|
| OBJ:| INFINITY   | 1800.000000 |              |
| 1:  | 59.58000:  | 6.000000    | 1.62280_56.9 |
| 2:  | 186.61000: | 0.200000    |              |
| 3:  | 53.07000:  | 2.000000    | 1.62041_60.3 |
| 4:  | 23.04000:  | 6.800000    |              |
| 5:  | 93.89000:  | 1.800000    | 1.58913_61.3 |
| 6:  | 31.31000:  | 7.400000    |              |
| 7:  | -52.09000: | 1.500000    | 1.48749_70.4 |
| 8:  | 110.97000: | *1          |              |
| 9:  | 109.27000: | 4.200000    | 1.80610_33.3 |
| 10: | -109.27000:| *2          |              |
| 11: | 53.22000:  | 10.400000   | 1.63980_34.6 |
| 12: | -26.47000: | 1.200000    | 1.80518_25.5 |
| 13: | -119.76000:| 8.200000    |              |
| 14: | 41.11000:  | 5.000000    | 1.71300_53.9 |
| 15: | -74.68000: | *3          |              |
| 16: | 87.70000:  | 2.700000    | 1.54072_47.2 |
| 17: | 21.64000:  | 10.000000   |              |
| 18: | -17.08000: | 1.200000    | 1.84666_23.8 |
| 19: | 61.38000:  | 9.500000    | 1.48749_70.4 |
| 20: | -24.05000: | 0.200000    |              |
| 21: | 332.89000: | 7.200000    | 1.77250_49.6 |
| 22: | 40.58000:  | *4          |              |
| 23: | 65.52000:  | 5.900000    | 1.76182_26.6 |
| 24: | -383.45000:| 1.000000    |              |
| 25: | INFINITY   | 35.000000   | 1.51680_64.2 |
| 26: | INFINITY   |             |              |

|     | WIDE    | NORMAL  | TELE     |
|-----|---------|---------|----------|
| *1  | 7.64000 | 5.12000 | 2.95000  |
| *2  | 8.50000 | 4.69000 | 0.80000  |
| *3  | 1.80000 | 3.06000 | 4.91000  |
| *4  | 1.53000 | 6.62000 | 10.81000 |

FIG. 14

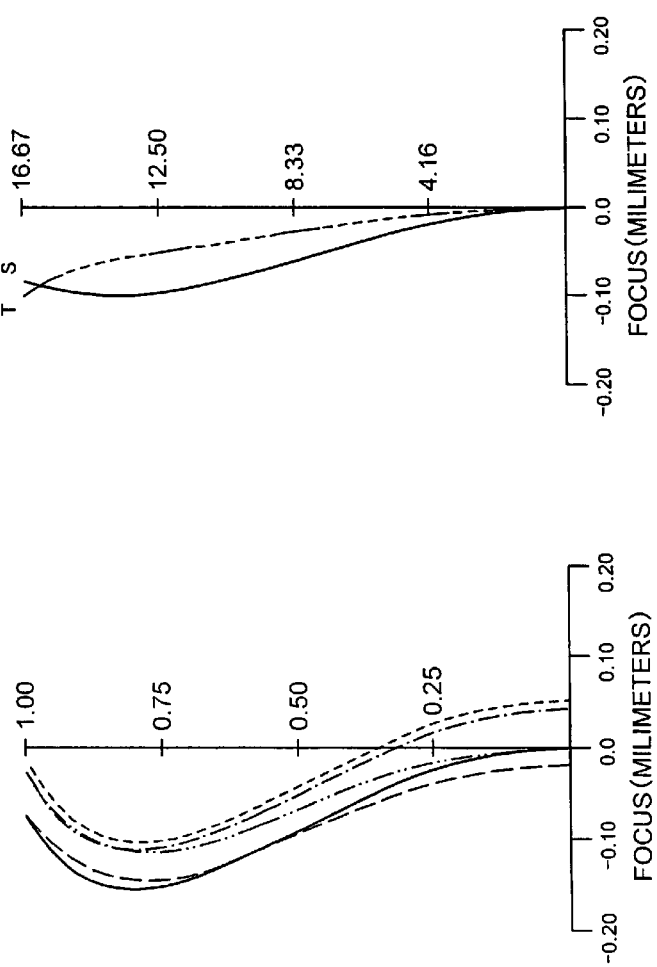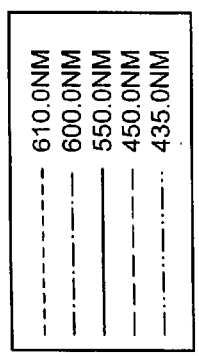

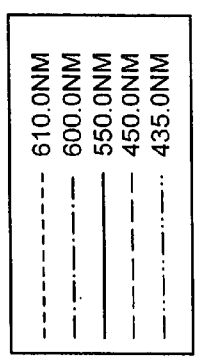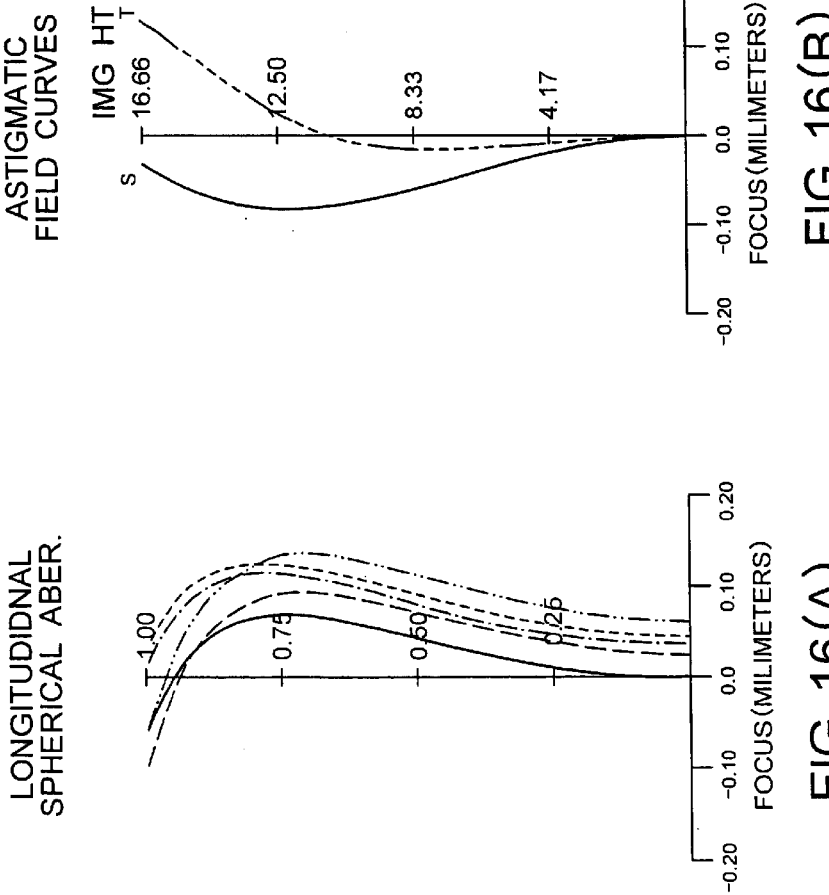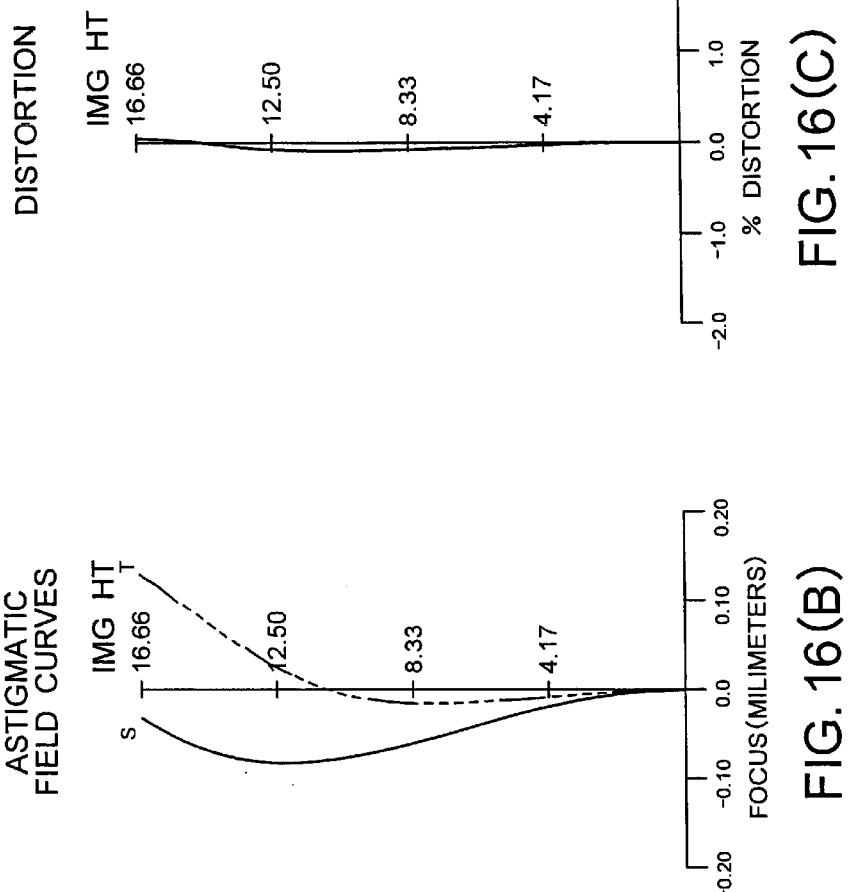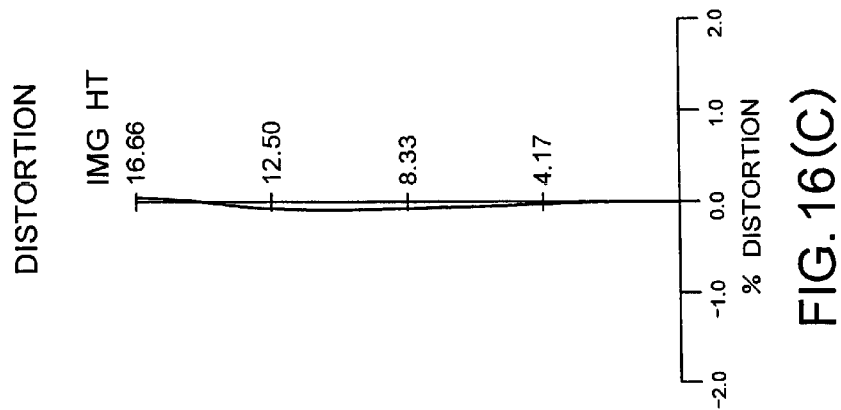

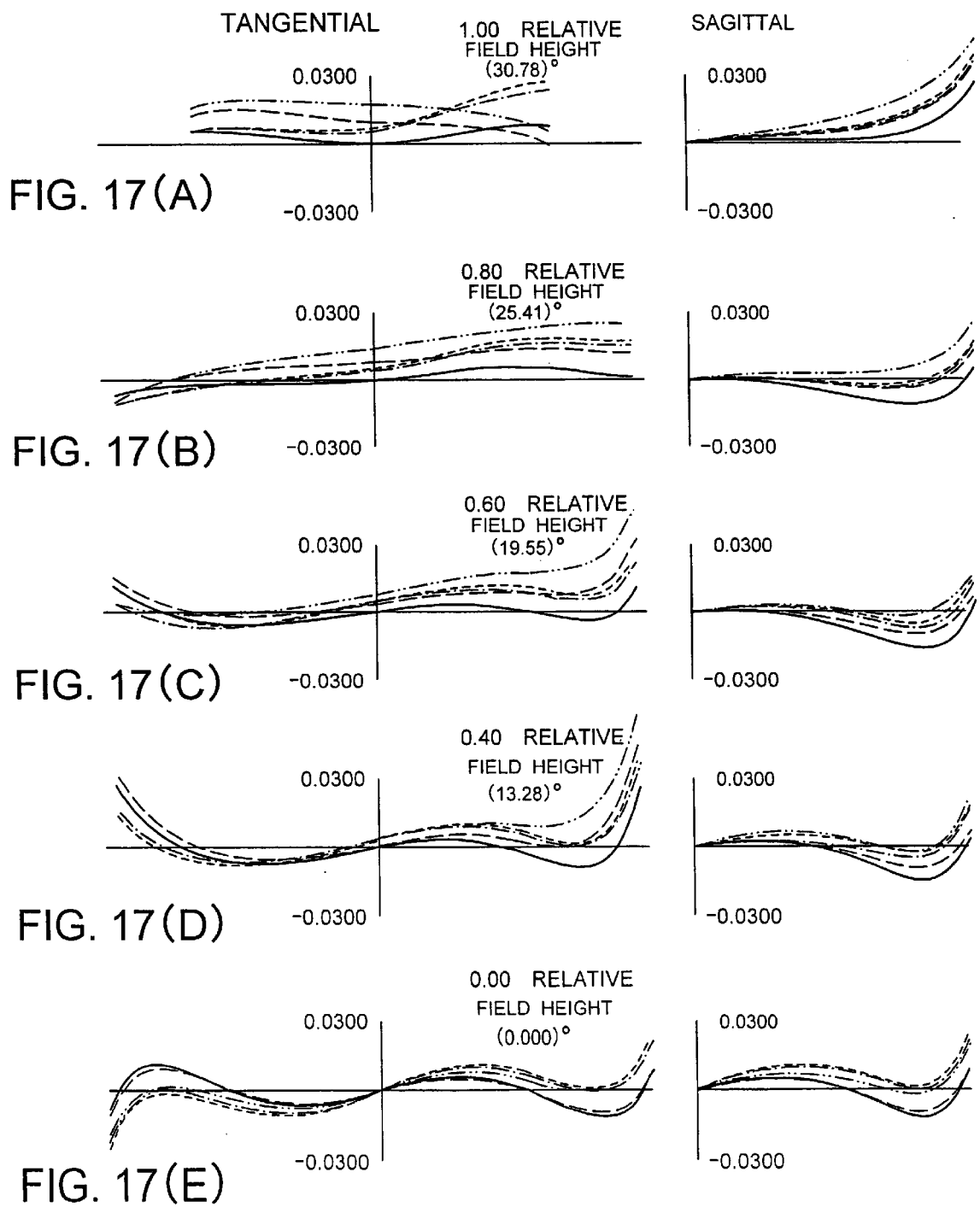

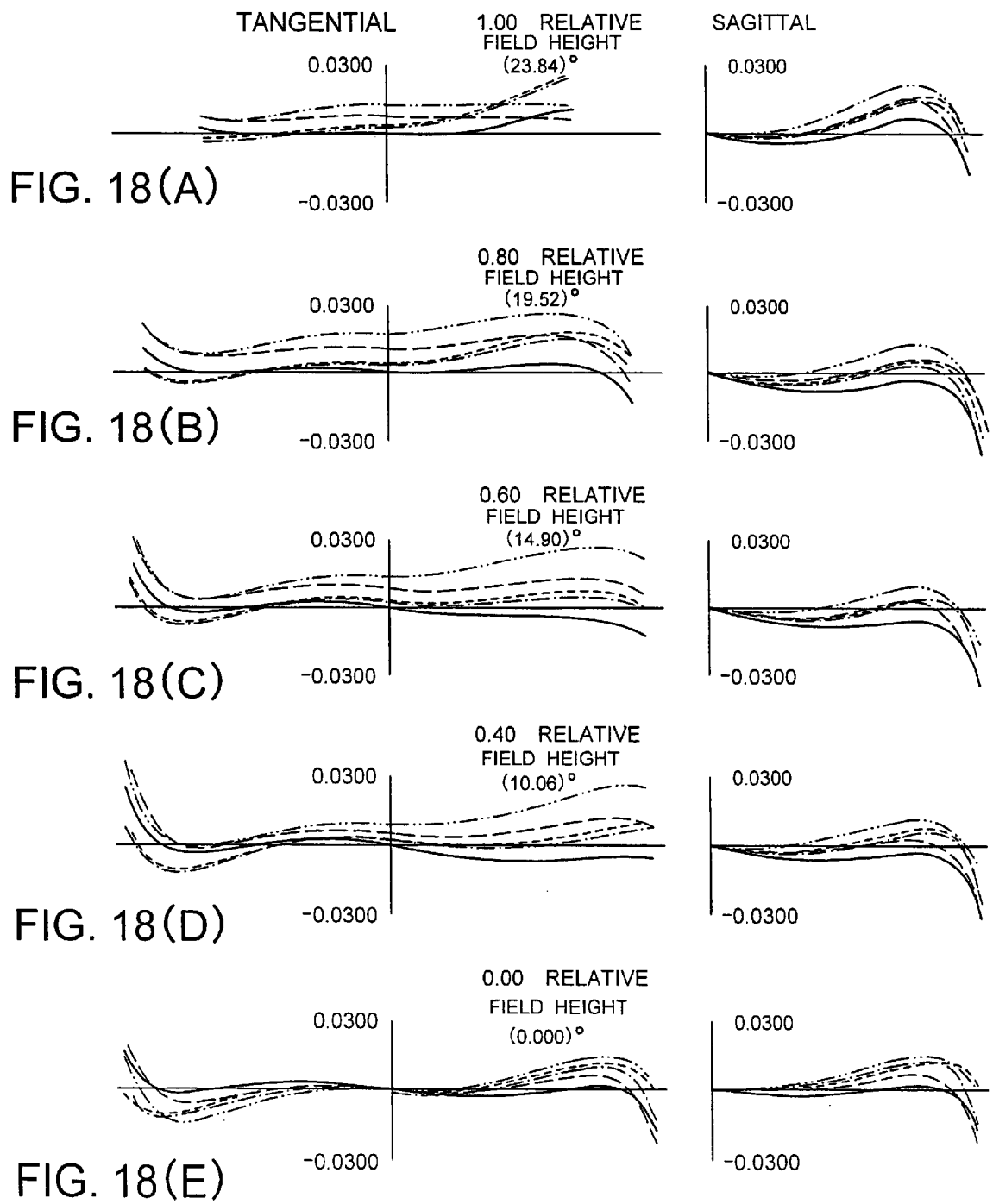

PROJECTION ZOOM LENS

BACKGROUND OF THE INVENTION

1. Field of the Invention

The present invention relates to a projection zoom lens suitable for use on a projector for projecting an image formed on a film, a slide or a liquid crystal display in an enlarged picture on a screen.

2. Description of the Related Art

Most projectors for projecting an image formed on a film, a slide or a liquid crystal display in an enlarged picture on a screen have a projection optical system employing a telecentric zoom lens.

Most prior art telecentric zoom lenses, such as those disclosed in JP-A Nos. 137165/2000, 186235/1998, 206409/2000, 019400/2000, 190821/1999, 168193/1998, 243917/1997 and 231219/1999, have a half filed angle of about 25° when set for the largest angular field.

A telecentric zoom lens having a half field angle of about 30° disclosed in, for example, JP-A No. 206409/2000 uses an aspherical lens as a comparatively large lens of the first lens group or the last lens group to reduce aberrations resulting from increase in the field angle, particularly, a distortion.

Projection zoom lenses have a zoom ratio on the order of, for example, 1.4, and most projection zoom lenses are of a two-lens-group type, three-lens-group type, four-lens-group type or five-lens-group type.

In the projection zoom lens, the first lens group has a high power to receive light rays in a wide field angle and hence tends to cause a distortion.

A wide-angle telecentric zoom lens employs an aspherical lens to reduce distortion. The aspherical lens is disposed in the vicinity of the front lens on the side of a screen or the rear lens on the side of an image plane to reduce distortion. Thus, the conventional wide-angle telecentric zoom lens is provided with an aspherical lens disposed on the exit or the entrance side thereof to reduce distortion.

Sometimes, an aspherical lens exercises not only a function to reduce distortion but also a function to reduce other aberrations excluding a chromatic aberration.

However, since the aspherical lens is disposed on the exit side or the entrance side in the conventional telecentric zoom lens, the design of the telecentric zoom lens is aimed principally at only the reduction of distortion and hence the telecentric zoom lens is unable to reduce other aberrations satisfactorily.

SUMMARY OF THE INVENTION

Accordingly, it is an object of the present invention to solve the foregoing problems in the prior art projection zoom lens and to provide a wide-angle projection zoom lens of simple construction including a limited number of lenses and capable of satisfactorily reducing aberrations, and to provide a projector which has high quality image.

To achieve the object, the present invention provides a projection zoom lens including a first lens group having a negative refracting power, a second lens group having a positive refracting power, a third lens group having a negative refracting power, and a fourth lens group having a positive refracting power; wherein the first, the second, the third and the fourth lens groups are arranged in that order from a screen side toward an image plane side along an optical axis; the first and the fourth lens groups are kept stationary, and the second and the third lens groups are moved along the optical axis to vary power from a limit wide angle power toward a limit telephoto power; the second lens group includes a 2nd-group 1st positive lens, a 2nd-group 1st compound lens formed by joining a 2nd-group 2nd positive lens having a convex surface on the image plane side and a 2nd-group 1st negative lens having a concave surface on the screen side, and a 2nd-group 3rd positive lens arranged in that order from the screen side toward the image plane side; the third lens group includes a 3rd-group 1st meniscus lens having a concave surface on the image plane, a 3rd-group 1st compound lens formed by joining a 3rd-group 1st negative lens having opposite concave surfaces and a 3rd-group 1st positive lens having opposite convex surfaces, and a 3rd-group 2nd meniscus lens having a convex surface on the image plane side arranged in that order from the screen side toward the image plane side; the first lens group has a focal length $f1$, the 2nd-group 1st positive lens and the 2nd-group 1st compound lens have a composite focal length $f2AB$ of a sign opposite to that of the focal length $f1$, and the focal length $f1$ and the composite focal length $f2AB$ meet an inequality:

$$0.5 < |f1/f2AB| < 2.0.$$

In the projection zoom lens according to the present invention, distance d between one surface on the side of the image plane of the 2nd-group 3rd positive lens and one surface on the side of the screen of the 3rd-group 1st meniscus lens varies between a value dW for the limit wide angle power and a value dT for the limit telephoto power, and the values dW and dT satisfy an inequality:

$$2.0 < dT/dW < 4.0.$$

In the projection zoom lens according to the present invention, the 2nd-group 3rd positive lens and the 3rd-group 1st meniscus lens are disposed at positions in the vicinity of an aperture position where a principal ray emerging from an image plane intersects the optical axis.

In the projection zoom lens according to the present invention, the 3rd-group 1st meniscus lens is an aspherical lens.

In the projection zoom lens according to the present invention, all the lenses are spherical lenses.

In the projection zoom lens according to the present invention, the second lens group includes a first lens subgroup and a second lens subgroup arranged in that order from the screen side toward the image plane side, the first lens subgroup has the 2nd-group 1st positive lens, and the second lens subgroup has the 2nd-group 2nd positive lens, the 2nd-group 1st compound lens and the 2nd-group 3rd positive lens.

In the projection zoom lens according to the present invention, the focal length $f1$ of the first lens group and the composite focal length $f2AB$ of the 2nd-group 1st positive lens and the 2nd-group 1st compound lens have opposite signs, respectively, and meet an inequality: $0.5 < |f1/f2AB| < 2.0$, and the composite power of the 2nd-group 1st positive lens and the 2nd-group 1st compound lens on the screen side of the second lens group, is substantially equal to that of the first lens group and has a sign opposite to that of the power of the first lens group. Therefore, distortions produced by the first and the second lens group cancel each other even if the first lens group has a large power. When $|f1/f2AB|$ is not smaller than 2.0 or not greater than 0.5, it is difficult to limit the distortion which is liable to be produced when the projection zoom lens is set for a wide angle power to a small value and other aberrations, such as curvature of field and coma aberration, increase.

The 2nd-group 1st compound lens of the second lens group functions as an achromatic lens for reducing chromatic aberration of magnification.

Whereas the 2nd-group 3rd positive lens of the second lens group, and the 3rd-group 1st meniscus lens of the third lens group move independently of each other, the surface on the image plane side of the 2nd-group 3rd positive lens, and the 3rd-group 1st meniscus lens are comparatively close to each other, and the positional relation between the surface on the image plane side of the 2nd-group 3rd positive lens, and the 3rd-group 1st meniscus lens meet the inequality: 2.0<dT/dW<4.0. The composite focal length of the second lens group is long, the moving distance of the second lens group increases and the length of the projection zoom lens is excessively long when dT/dW is not smaller than 4.0, and the composite focal length of the second lens group is short and aberrations are liable to be produced when dT/dW is not greater than 2.0.

Since the 2nd-group 3rd positive lens and the 3rd-group 1st meniscus lens are disposed at positions in the vicinity of the aperture position where a principal ray emerging from the image plane intersects the optical axis, formation of flare spots, which are liable to be formed when the aperture is large, can be suppressed without requiring disposing an aperture stop at a position where an aperture stop is disposed in the conventional projection zoom lens. Particularly, formation of flare spots when the projection zoom lens is set for the limit wide-angle power can be effectively suppressed. The term, aperture position signify a position suitable for disposing an aperture stop, corresponding to the intersection of a main light beam emerging from the image plane and the optical axis. The positions of the 2nd-group 3rd positive lens and the 3rd-group 1st meniscus lens the aperture position are nearer than those of other lenses and are within a distance equal to several times the thickness of the lens, such as three times the thickness of the lens, from the intersection of the principal ray and the optical axis.

The distance d between the surface on the image plane side of the 2nd-group 3rd positive lens and the surface on the screen side of the 3rd-group 1st meniscus lens increases as the power is changed from the limit wide angle power toward the limit telephoto power, and the 2nd-group 3rd positive lens and the 3rd-group 1st meniscus lens can be disposed at the positions in the vicinity of the aperture position when the distances dW and dT meet the inequality: 2.0<dT/dW<4.0. Thus, formation of flare spots, which are liable to be formed when the aperture is large, can be suppressed without requiring disposing an aperture stop at a position where an aperture stop is disposed in the conventional projection zoom lens and, particularly, formation of flare spots when the projection zoom lens is set for the limit wide angle power can be effectively suppressed.

Aberrations can be further efficiently improved by using an aspherical lens as the 3rd 1st meniscus lens. As compared with the use of an aspherical lens as the lens in the vicinity of the front lens nearest to the screen or the lens in the vicinity of the rear lens nearest to the image plane, the object of employment of the aspherical lens is not aimed only at reducing distortion, and the object of use of the spherical lens is not limited to the reduction of distortion, and can be used for reducing other aberrations including spherical aberration and astigmatism. Since the aspherical lenses have diameters smaller than those of aspherical lenses as the front and the rear lens, and the lenses in the vicinity of the front and the rear lens may be formed of inexpensive materials, the projection zoom lens can be manufactured at low costs.

Since the second lens group includes the first and the second lens subgroup which are individually movable relative to each other, the first lens subgroup has the 2nd-group 1st positive lens, and the second lens subgroup has the 2nd-group 2nd positive lens, the 2nd-group 1st compound lens and the 2nd-group 3rd positive lens, the inequality: 0.5<|f1/f2AB|<2.0 can be satisfied without difficulty, the 2nd-group 3rd positive lens and the 3rd-group 1st meniscus lens can be disposed at positions in the vicinity of the aperture position without difficulty, and formation of flare spots liable to be formed when the aperture is increased can be suppressed.

In claims 7, 8, 9, 11 and 12, values modified by "approximately" are following values. For example, "approximately 0.94" in claim 7 indicates a value greater than about 0.93 and smaller than about 0.95. Similarly, "approximately 3.3" indicates a value greater than about 3.2 and smaller than about 3.4, "approximately 1.0" indicates a value greater than 0.9 and smaller than 1.1, "approximately 3.1" indicates a value greater than 3.0 and smaller than 3.2, "approximately 0.73" indicates a value greater than 0.72 and smaller than 0.74, "approximately 2.7" indicates a value greater than 2.6 and smaller than 2.8, "approximately 28 mm" indicates a length greater than 27 mm and smaller than 29 mm, and "approximately 29°" indicates an angle greater than 28° and smaller than 30°.

According to the present invention, it is able to provide the projector including an image forming device for forming an image and a projector zoom lens for projecting the image, wherein the projector zoom lens is given by any one of the projector zoom lens mentioned above. The projector is able to provide high quality image. Such the image forming device may be a light modulation device such as a liquid crystal display or a device composed of, for example, micro mirrors, a film or a slide.

BRIEF DESCRIPTION OF THE DRAWINGS

The above and other objects, features and advantages of the present invention will become more apparent form the following description taken in connection with the accompanying drawings, in which:

FIG. 2 is a list of lens data on the projection zoom lens shown in FIG. 1, where OBJ stands for surface numbers, RDY stands for radii of curvature (mm), THI stands for lens thicknesses or thicknesses of air spaces each between adjacent surfaces, *1, *2 and *3 indicate distances between lens groups, respectively, when the projection zoom lens shown in FIG. 1 is set for the limit wide angle power, the normal power and the limit telephoto power.

FIGS. 3(A), 3(B) and 3(C) are graphs showing spherical aberration, astigmatism and distortion caused by the projection zoom lens shown in FIG. 1, respectively, when the projection zoom lens shown in FIG. 1 is set for the limit wide-angle power;

FIGS. 4(A), 4(B) and 4(C) are graphs showing spherical aberration, astigmatism and distortion caused by the projection zoom lens shown in FIG. 1, respectively, when the projection zoom lens shown in FIG. 1 is set for the telephoto end power;

FIGS. 5(A), 5(B), 5(C), 5(D) and 5(E) are graphs showing transverse aberrations when relative field height is 1.00, 0.80, 0.60, 0.40 and 0.00, respectively, when the projection zoom lens shown in FIG. 1 is set for the limit wide-angle power;

FIGS. 6(A), 6(B), 6(C), 6(D) and 6(E) are graphs showing transverse aberrations when relative field height is 1.00, 0.80, 0.60, 0.40 and 0.00, respectively, when the projection zoom lens shown in FIG. 1 is set for the limit telephoto power;

FIG. 8 is a list of lens data on the projection zoom lens shown in FIG. 7, where OBJ stands for surface numbers, RDY stands for radii of curvature (mm), THI stands for lens thicknesses or thicknesses of air spaces each between adjacent surfaces, *1, *2 and *3 indicate values of distances between lens groups when the projection zoom lens shown in FIG. 7 is set for the limit wide angle power, the normal power and the limit telephoto power, respectively.

FIGS. 9(A), 9(B) and 9(C) are graphs showing spherical aberration, astigmatism and distortion caused by the projection zoom lens shown in FIG. 7, respectively, when the projection zoom lens shown in FIG. 7 is set for the limit wide-angle power;

FIGS. 10(A), 10(B) and 10(C) are graphs showing spherical aberration, astigmatism and distortion caused by the projection zoom lens shown in FIG. 7, respectively, when the projection zoom lens shown in FIG. 7 is set for the telephoto end power;

FIGS. 11(A), 11(B), 11(C), 11(D) and 11(E) are graphs showing transverse aberration when relative field height is 1.00, aberration when relative field height is 0.80, aberration when relative field height is 0.60, aberration when relative field height is 0.40 and aberration when relative field height is 0.00, respectively, when the projection zoom lens shown in FIG. 7 is set for the limit wide angle power;

FIGS. 12(A), 12(B), 12(C), 12(D) and 12(E) are graphs showing transverse aberration when relative field height is 1.00, aberration when relative field height is 0.80, aberration when relative field height is 0.60, aberration when relative field height is 0.40 and aberration when relative field height is 0.00, respectively, when the projection zoom lens shown in FIG. 7 is set for the limit telephoto power;

FIG. 14 is a list of lens data on the projection zoom lens shown in FIG. 13, where OBJ stands for surface numbers, RDY stands for radii of curvature (mm), THI stands for lens thicknesses or thicknesses of air spaces each between adjacent surfaces, *1, *2 and *3 indicate values of distances between lens groups when the projection zoom lens shown in FIG. 13 is set for the limit wide angle power, the normal power and the limit telephoto power, respectively.

FIGS. 15(A), 15(B) and 15(C) are graphs showing spherical aberration, astigmatism and distortion caused by the projection zoom lens shown in FIG. 13, respectively, when the projection zoom lens shown in FIG. 13 is set for the limit wide-angle power;

FIGS. 16(A), 16(B) and 16(C) are graphs showing spherical aberration, astigmatism and distortion caused by the projection zoom lens shown in FIG. 13, respectively, when the projection zoom lens shown in FIG. 13 is set for the limit telephoto power;

FIGS. 17(A), 17(B), 17(C), 17(D) and 17(E) are graphs showing transverse aberration when relative field height is 1.00, aberration when relative field height is 0.80, aberration when relative field height is 0.60, aberration when relative field height is 0.40 and aberration when relative field height is 0.00, respectively, when the projection zoom lens shown in FIG. 13 is set for the limit wide angle power;

FIGS. 18(A), 18(B), 18(C), 18(D) and 18(E) are graphs showing transverse aberration when relative field height is 1.00, aberration when relative field height is 0.80, aberration when relative field height is 0.60, aberration when relative field height is 0.40 and aberration when relative field height is 0.00, respectively, when the projection zoom lens shown in FIG. 13 is set for the limit telephoto power.

DESCRIPTION OF THE PREFERRED EMBODIMENTS

Figure 1A:
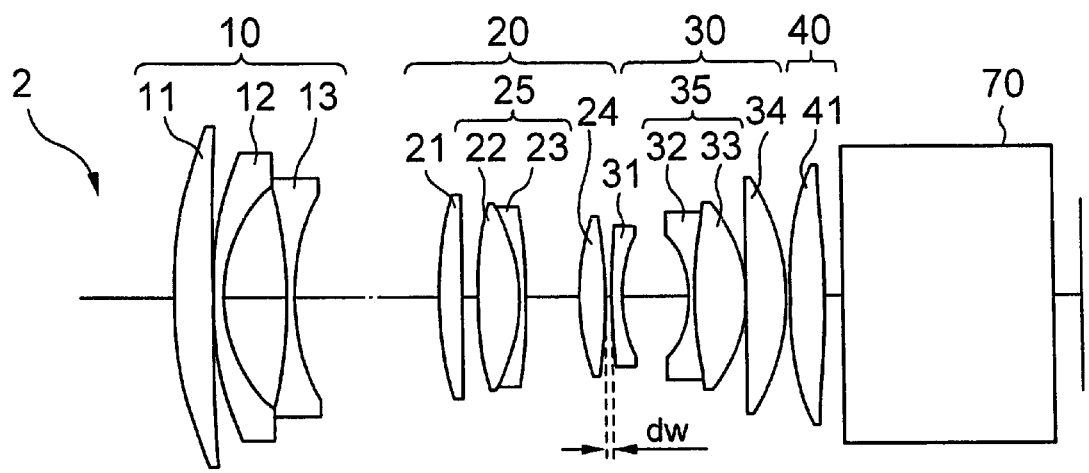
FIGS. 1(a), 1(b) and 1(c) are schematic side elevations of a projection zoom lens in a first embodiment according to the present invention in a limit wide angle setting for a limit wide angle power, a normal setting for a normal power, and a limit telephoto setting for a limit telephoto power, respectively.

FIGS. 1, 7 and 13 show projection zoom lenses 2 in a first, a second and a third embodiments, respectively, in a limit wide angle setting for a limit wide angle power ((a)), a normal setting for a normal power, ((b)) and a limit telephoto setting for a limit telephoto power (((c)), respectively.

The projection zoom lens 2 shown in FIG. 13 includes four lens groups, namely, a first lens group having a negative refracting power, a second lens group 20 having a positive refracting power, a third lens group 30 having a negative refracting power, and a fourth lens group 40 having a positive refracting power, which are arranged in that order from a screen side (the left side as viewed in FIG. 1) toward an image plane side (right side as viewed in FIG. 1). The projection zoom lens 2 is disposed at the projector. The projector comprises an image forming device. The image forming device has three liquid crystal displays. Three images formed by the three liquid crystal displays are composed by the composite prism 70. The composite prism is disposed on the image plane side of the fourth lens group 40. The image composed by the composite prism 70 is projected by the projection zoom lens 2 onto a screen. The three liquid crystal displays are disposed in the vicinity of the image plane of the zoom lens 2. The right side in FIG. 1 is called the image plane side instead of an object point side because an image formed on a film, a slide or a liquid crystal display are placed on the image plane side.

The power of the projection zoom lens 2 is varied from a limit wide angle power toward a limit telephoto power by moving the second lens group 20 and the third lens group 30 toward the screen side along the optical axis of the projection zoom lens 2, while the first lens group 10 and the fourth lens group 40 are kept stationary.

The second lens group 20 includes a 2nd-group 1st positive lens 21, a 2nd-group 1st composite lens 25 formed by joining a 2nd-group 2nd positive lens having a convex surface facing the image plane side and a 2nd-group 1st negative lens 23 having a concave surface facing the screen side, and a 2nd-group 3rd positive lens 24, which are arranged in that order from the screen side toward the image plane side. In the projection zoom lens 2 in a third embodiment according to the present invention, the second lens group 20 includes a first lens subgroup 20a and a second lens subgroup 20b, which are individually movable.

The third lens group 30 includes a 3rd-group 1st meniscus lens 31 having a concave surface facing the image plane side, a 3rd-group 1st composite lens 35 formed by joining a 3rd-group 1st negative lens 32 having opposite concave surfaces and a 3rd-group 1st positive lens 33 having opposite convex surfaces, and a 3rd-group 2nd meniscus lens 34 having a convex surface facing the image plane side, which are arranged in that order from the screen side toward the image plane side.

The first lens group 10 includes a positive lens 11, a meniscus lens 12 and a negative lens 13 having opposite concave surfaces, which are arrange in that order from the screen side toward the image plane side. In the third embodiment, the first lens group 10 further includes a negative lens 14 disposed on the image plane side of the negative lens 13.

The fourth lens group 40 has a single positive lens 41.

The first lens group 10 has a focal length f1, and the 2nd-group 1st positive lens 21 and the 2nd-group 1st compound lens 25 have a composite focal length f2AB of a sign opposite to that of the focal length f1. The focal length f1 and the composite focal length f2AB meet an inequality: 0.5<|f1/f2AB|<2.0.

The distance d between the surface on the image plane side of the 2nd-group 3rd positive lens 24, and the surface on the screen side of the 3rd-group 1st meniscus lens 31 increases from a distance dW in a state where the projection zoom lens 2 is set in the limit wide angle setting for the limit wide angle power toward a distance dT in a state where the projection zoom lens 2 is set in the limit telephoto setting for the limit telephoto power. The distances dW and dT meet an inequality: 2.0<dT/dW<4.0.

Figure 19:
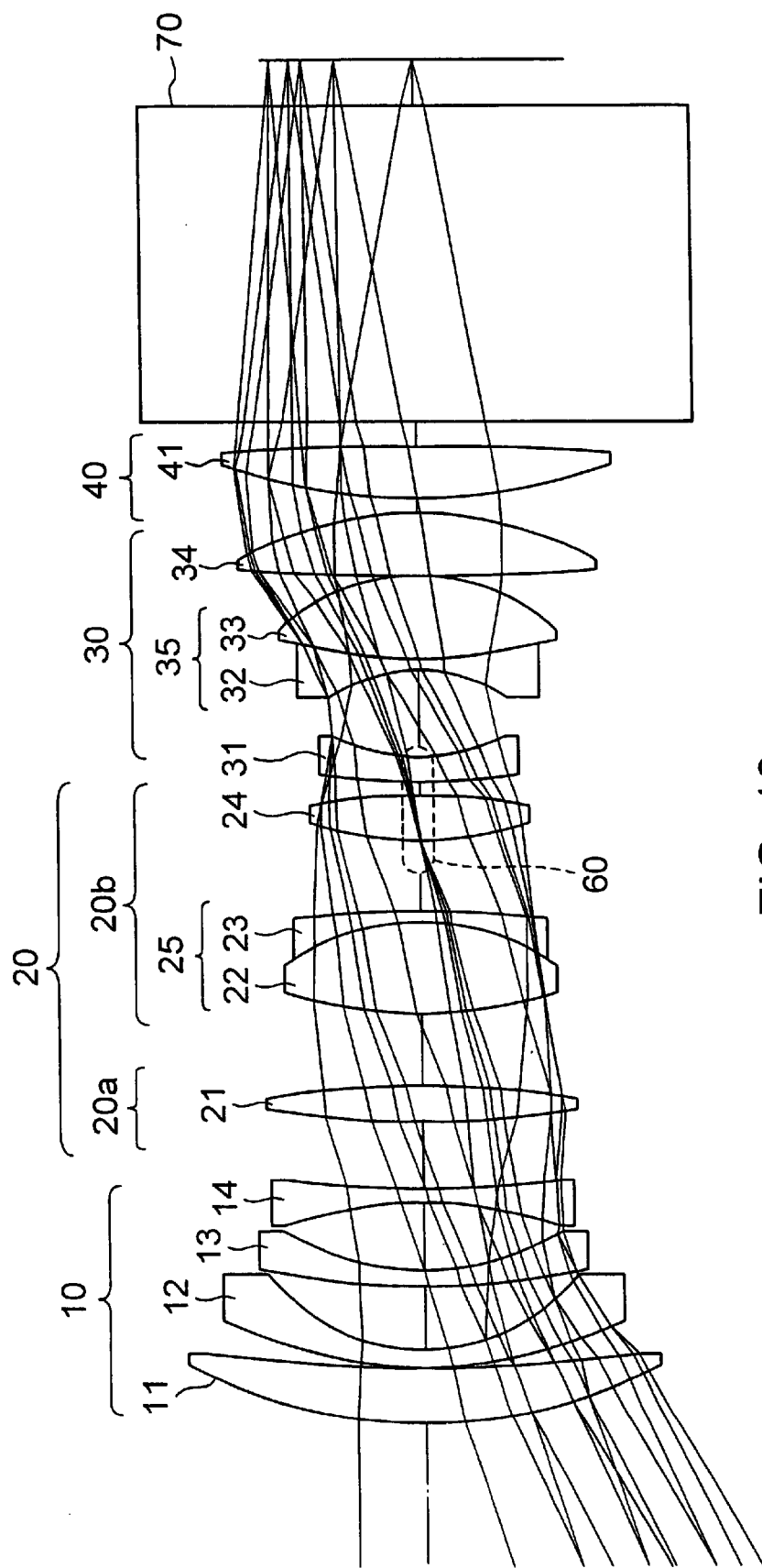
FIG. 19 is a schematic side elevation of assistance in explaining paths of light rays when a 2nd-group 3rd positive lens and a 3rd-group 1st meniscus lens included in the projection zoom lens shown in FIG. 13 are disposed at positions in the vicinity of an aperture position where a principal ray emerging from an image plane intersects the optical axis of the projection zoom lens.

The 2nd-group 3rd positive lens 24 and the 3rd-group 1st meniscus lens 31 are disposed at positions in the vicinity of an aperture position 60 (FIG. 19) where a principal ray emerging from the image plane intersects the optical axis of the projection zoom lens 2, respectively. Such a positional relation between the respective positions of the 2nd-group 3rd positive lens 24 and the 3rd-group 1st meniscus lens 31 applies commonly to the first, the second and the third embodiment. FIG. 19 shows paths of light rays in the third embodiment by way of example.

The distance d between the surface on the image plane side of the 2nd-group 3rd positive lens 24, and the surface on the screen side of the 3rd-group 1st meniscus lens 31 increases from a distance dW in a state where the projection zoom lens 2 is set in the limit wide angle setting for the limit wide angle power toward a distance dT in a state where the projection zoom lens 2 is set in the limit telephoto setting for the limit telephoto power. The distances dW and dT meet an inequality: 2.0<dT/dW<4.0.

The projection zoom lens 2 in a first embodiment according to the present invention will be described.

Figure 1B:
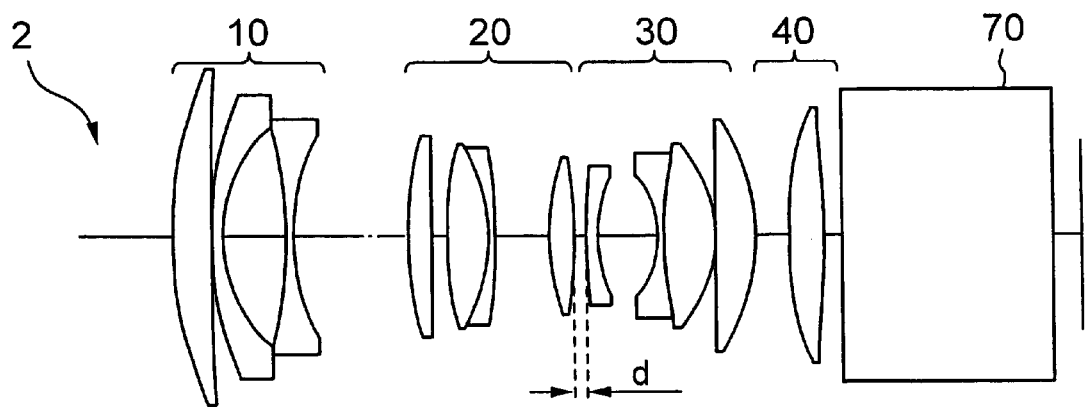
Figure 1C:
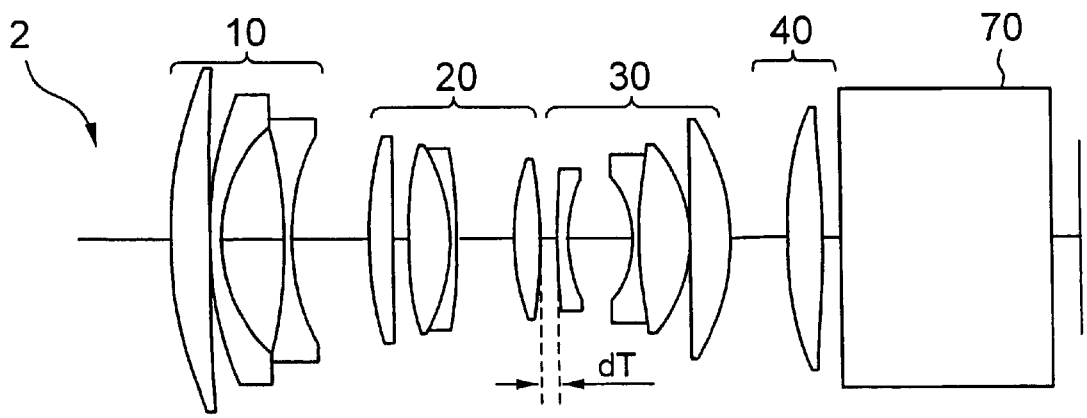

FIGS. 1(a), 1(b) and 1(c) are schematic side elevations of the projection zoom lens in the first embodiment in a limit wide angle setting for a limit wide angle power, a normal setting for a normal power, and a limit telephoto setting for a limit telephoto power, respectively. All the component lenses of the first lens group 10, the second lens group 20, the third lens group 30 and the fourth lens group 40 of the projection zoom lens 2 in the first embodiment are spherical lenses.

The following is data on the projection zoom lens 2 in the first embodiment.

Focal length f: 28.2 mm (limit wide angle setting) to 37.6 mm (limit telephoto setting), f number FNO: 1.7 to 2.0, dT/dW: 3.29, |f1/f2AB|=0.94.

The projection zoom lens 2 meets the requisite conditions: 0.5<|f1/f2AB|<2.0, and 2.0<dT/dW<4.0.

FIG. 2 is a list of lens data on the projection zoom lens 2 shown in FIG. 1, where OBJ stands for surface numbers sequentially assigned to the surfaces of the lenses from the screen side toward the image plane side, RDY stands for radii of curvature (mm), and THI stands for lens thicknesses or thicknesses of air spaces each between adjacent surfaces. GLA stands for the D line refractive indices and Abbe's numbers of lens materials. For example, GLA 1.70200-40.2 signifies that the lens material has a D line refractive index of 1.70200 and an Abbe's number of 40.2.

In FIG. 2, values specified by *1 are distances between the surface on the image plane side of the negative lens 13 and the surface on the screen side of the 2nd-group 1st positive lens 21 when the projection zoom lens is set in the limit wide angle setting, the normal setting and the limit telephoto setting, values specified by *2 are distances between the surface on the image plane side of the 2nd-group 1st negative lens 23 and the surface on the screen side of the 2nd-group 3rd positive lens 24 when the projection zoom lens is set in the limit wide angle setting, the normal setting and the limit telephoto setting, and values specified by *3 are distances between the surface on the image plane side of the 3rd-group 2nd meniscus lens 34 and the surface on the screen side of the positive lens 41 when the projection zoom lens is set in the limit wide angle setting, the normal setting and the limit telephoto setting.

Aberrations caused by the projection zoom lens 2 as set in the limit wide angle setting are shown in FIGS. 3 and 5, and those caused by the projection zoom lens 2 as set in the limit telephoto setting are shown in FIGS. 4 and 6. FIGS. 3(A) and 4(A) show spherical aberrations, FIGS. 3(B) and 4(B) show astigmatisms, and FIGS. 3(C) and 4(C) show distortions. In FIGS. 3(B) and 4(B), curves S and T indicate aberrations with respect to a sagittal image surface and a tangential image surface, respectively. FIGS. 5(A)and 6(A), 5(B) and 6(B), 5(C) and 6(C), 5(D) and 6(D), and 5(E) and 6(E) are graphs showing transverse aberrations when relative field height is 1.00, 0.80, 0.60, 0.40 and 0.00, respectively.

The projection zoom lens 2 in a second embodiment according to the present invention will be described hereinafter.

Figure 7A:
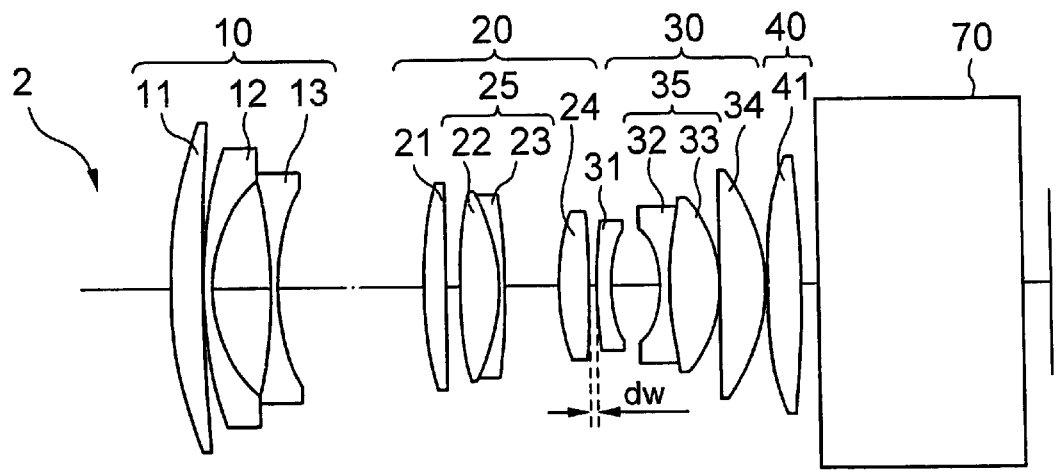
FIGS. 7(a), 7(b) and 7(c) are schematic side elevations of a projection zoom lens in a second embodiment according to the present invention in a limit wide angle setting for a limit wide angle power, a normal setting for a normal power, and a limit telephoto setting for a limit telephoto power, respectively.
Figure 7B:
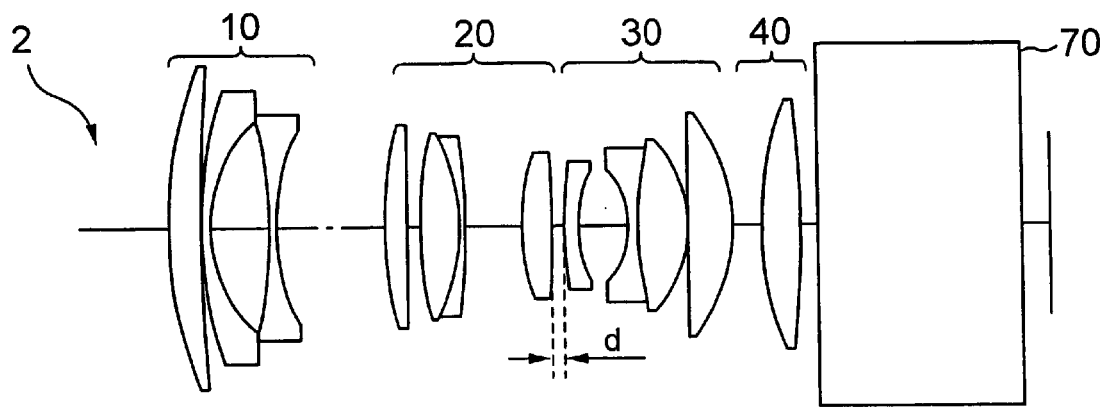
Figure 7C:
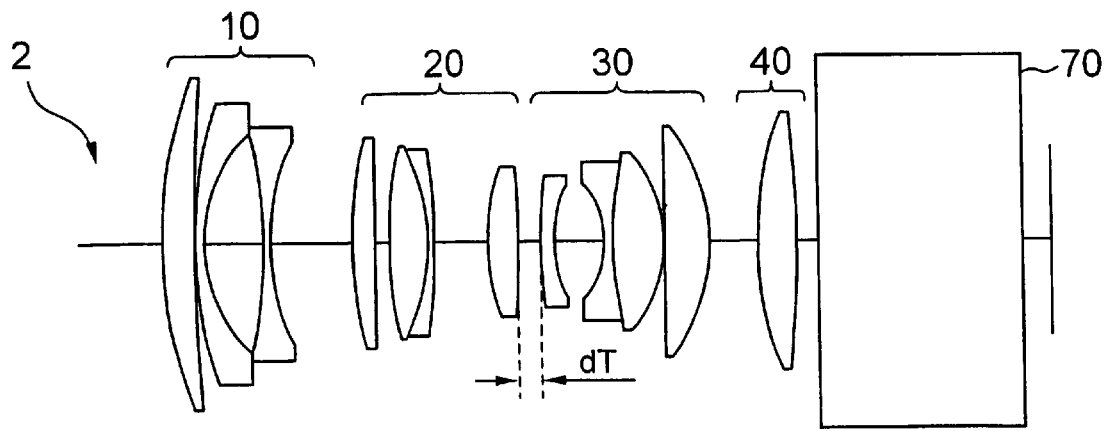

FIGS. 7(a), 7(b) and 7(c) are schematic side elevations of the projection zoom lens 2 in the second embodiment in a limit wide angle setting for a limit wide angle power, a normal setting for a normal power, and a limit telephoto setting for a limit telephoto power, respectively. In the projection zoom lens 2 in the second embodiment, the 3rd-group 1st meniscus lens 31 of the third lens group 30 is an aspherical lens and all the rest of the lenses of the first lens group 10, the second lens group 20, the third lens group 30 and the fourth lens group 40 are spherical lenses.

The aspherical 3rd-group 1st meniscus lens 31 has an aspherical surface on the screen side, and a spherical surface on the image plane side. The aspherical surface of the 3rd-group 1st meniscus lens 31 is defined by Expression (1)

$$x = \frac{Ry^2}{1 + \sqrt{1-(1+K)R^2y^2}} + Ay^4 + By^6 + Cy^8 + Dy^{10} \quad (1)$$

where R indicates the radius of curvature (RDY) of the surface No. 14. Values of coefficients K, A, B, C and D are shown in FIG. 8.

The following is data on the projection zoom lens 2 in the second embodiment.

Focal length f: 28.1 mm (limit wide angle setting) to 37.3 mm (limit telephoto setting), f number FNO: 1.7 to 2.0, dT/dW: 3.08, |f1/f2AB|=1.0.

The projection zoom lens 2 meets the requisite conditions: 0.5<|f1/f2AB|<2.0, and 2.0<dT/dW<4.0.

Aberrations caused by the projection zoom lens 2 as set in the limit wide angle setting are shown in FIGS. 9 and 11, and those caused by the projection zoom lens 2 as set in the limit telephoto setting are shown in FIGS. 10 and 12. FIGS. 9(A) and 10(A) show spherical aberrations, FIGS. 9(B) and 10(B) show astigmatisms, and FIGS. 9(C) and 10(C) show distortions. In FIGS. 9(B) and 10(B), curves S and T indicate aberrations with respect to a sagittal image surface and a tangential image surface, respectively. FIGS. 11(A) and 12(A), 11(B) and 12(B), 11(C) and 12(C), 11(D) and 12(D), and 11(E) and 12(E) are graphs showing transverse aberrations when relative field height is 1.00, 0.80, 0.60, 0.40 and 0.00, respectively.

The projection zoom lens 2 in a third embodiment according to the present invention will be described hereinafter.

Figure 13A:
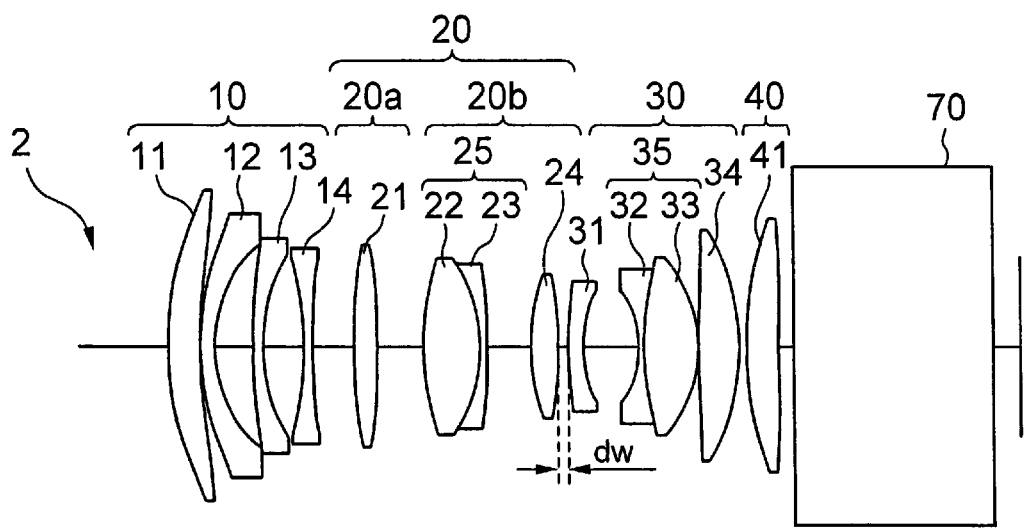
FIGS. 13(a), 13(b) and 13(c) are schematic side elevations of a projection zoom lens in a third embodiment according to the present invention in a limit wide angle setting for a limit wide angle power, a normal setting for a normal power, and a limit telephoto setting for a limit telephoto power, respectively.
Figure 13B:
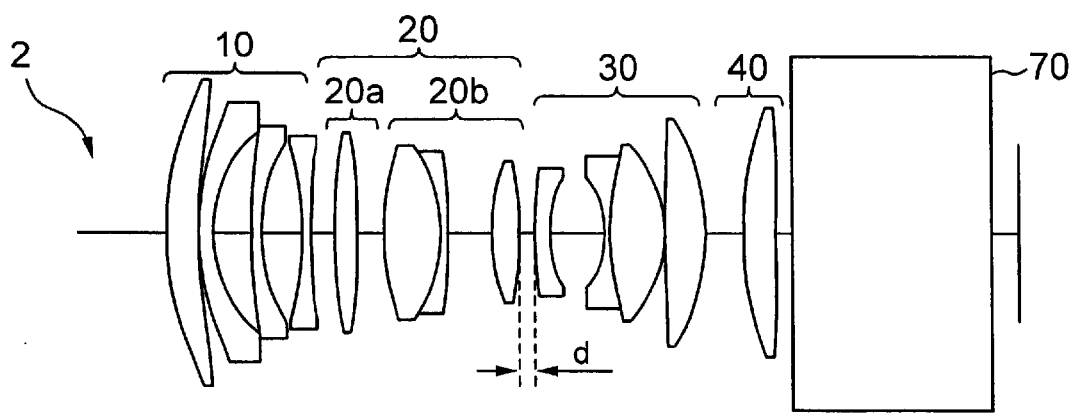
Figure 13C:
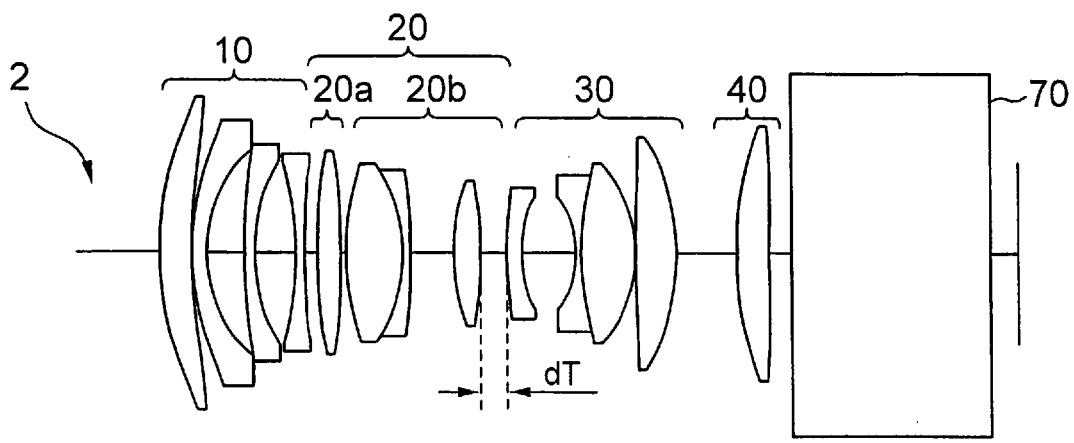

FIGS. 13(a), 13(b) and 13(c) are schematic side elevations of the projection zoom lens 2 in the third embodiment in a limit wide angle setting for a limit wide angle power, a normal setting for a normal power, and a limit telephoto setting for a limit telephoto power, respectively. In the projection zoom lens 2 in the third embodiment, the second lens group 20 includes the first lens subgroup 20a and the second lens subgroup 20b arranged in that order from the screen side toward the image plane side. The first lens subgroup 20a has a single 2nd-group 1st positive lens 21, and the second lens subgroup 20b has a 2nd-group 2nd positive lens 22, a 2nd-group 1st composite lens 23 and a 2nd-group 3rd positive lens 24.

The first lens group 10 has the negative lens 14 disposed on the image plane side of the negative lens 13.

As shown in FIG. 19, the 2nd-group 3rd positive lens 24 and the 3rd-group 1st meniscus lens 31 are disposed at positions in the vicinity of the aperture position 60 where a principal ray emerging from the image plane intersects the optical axis of the projection zoom lens 2, respectively. Thus, the disposition of the lenses at the positions in the vicinity of the aperture position where an aperture stop is disposed in the conventional zoom lens suppresses formation of flare spots, which are liable to be formed when the aperture is large, Particularly, formation of flare spots when the projection zoom lens is set for the limit wide angle power can be effectively suppressed.

The following is data on the projection zoom lens 2 in the third embodiment.

Focal length f: 28.3 mm (limit wide angle setting) to 37.6 mm (limit telephoto setting), f number FNO: 1.7 to 2.0, dT/dW: 2.73, |f1/f2AB|=0.73.

The projection zoom lens 2 meets the requisite conditions: 0.5<|f1/f2AB|<2.0, and 2.0<dT/dW<4.0.

Aberrations caused by the projection zoom lens 2 as set in the limit wide angle setting are shown in FIGS. 15 and 17, and those caused by the projection zoom lens 2 as set in the limit telephoto setting are shown in FIGS. 16 and 18. FIGS. 15(A) and 16(A) show spherical aberrations, FIGS. 15(B) and 16(B) show astigmatisms, and FIGS. 15(C) and 16(C) show distortions. In FIGS. 15(B) and 16(B), curves S and T indicate aberrations with respect to a sagittal image surface and a tangential image surface, respectively. FIGS. 17(A) and 18(A), 17(B) and 18(B), 17(C) and 18(C), 17(D) and 18(D), and 17(E) and 18(E) are graphs showing transverse aberrations when relative field height is 1.00, 0.80, 0.60, 0.40 and 0.00, respectively.

In the foregoing projection zoom lenses according to the present invention, the focal length f1 of the first lens group 10 and the composite focal length f2AB of the 2nd-group 1st positive lens 21 and the 2nd-group 1st compound lens 25 have opposite signs, respectively, and meet the inequality: 0.5<|f1/f2AB|<2.0, and the composite power of the 2nd-group 1st positive lens 21 and the 2nd-group 1st compound lens 25 on the screen side of the second lens group 20 is substantially equal to that of the first lens group 10 and has a sign opposite to that of the power of the first lens group 10. Therefore, distortions produced by the first lens group 10 and the second lens group 20 cancel each other even if the first lens group 10 has a large power. When |f1/f2AB| is not smaller than 2.0 or not greater than 0.5, it is difficult to limit the distortion which is liable to be produced when the projection zoom lens 2 is set for a wide angle power to a small value and other aberrations, such as curvature of field and coma aberration, increase.

Whereas the 2nd-group 3rd positive lens 24 of the second lens group 20, and the 3rd-group 1st meniscus lens 31 of the third lens group 30 move independently of each other, the surface on the image plane side of the 2nd-group 3rd positive lens 24, and the 3rd-group 1st meniscus lens 31 are comparatively close to each other, and the positional relation between the surface on the image plane side of the 2nd-group 3rd positive lens 24, and the 3rd-group 1st meniscus lens 25 meet the inequality: 2.0<dT/dW<4.0. The composite focal length of the second lens group 20 is long, the moving distance of the second lens group 20 increases and the length of the projection zoom lens 2 is excessively long when dT/dW is not smaller than 4.0, and the composite focal length of the second lens group 20 is short and aberrations are liable to be produced when dT/dW is not greater than 2.0. Thus, the overall length of the projection zoom lens is short and the production of aberrations can be suppressed when the projection zoom lens 2 meet the requisite condition: 2.0<dT/dW<4.0.

Since the 2nd-group 3rd positive lens 24 and the 3rd-group 1st meniscus lens 31 are disposed at positions in the vicinity of the aperture position where a principal ray emerging from the image plane intersects the optical axis, formation of flare spots, which are liable to result from increase in the aperture due to the disposition of a lens at the position where an aperture stop is to be disposed, can be suppressed. Particularly, formation of flare spots when the projection zoom lens is set for the limit wide angle power can be effectively suppressed.

The distance d between the surface on the image plane side of the 2nd-group 3rd positive lens 24 and the surface on the screen side of the 3rd-group 1st meniscus lens 31 increases as the power is changed from the limit wide angle power toward the limit telephoto power, and the 2nd-group 3rd positive lens 24 and the 3rd-group 1st meniscus lens 31 are disposed at the positions in the vicinity of the aperture position 60 when the distances dW and dT meet the requisite condition: 2.0<dT/dW<4.0. Thus, formation of flare spots, which are liable to result from increase in the aperture due to the disposition of a lens at the position where an aperture stop is to be disposed, can be suppressed. Particularly, formation of flare spots when the projection zoom lens is set for the limit wide angle power can be effectively suppressed.

Aberrations can be further efficiently improved by using an aspherical lens as the 3rd-group 1st meniscus lens 31. As compared with the use of an aspherical lens as the lens in the vicinity of the front lens nearest to the screen or the lens in the vicinity of the rear lens nearest to the image plane, the object of employment of the aspherical lens is not aimed only at reducing distortion, and the object of use of the spherical lens is not limited to the reduction of distortion, and can be used for reducing other aberrations including spherical aberration and astigmatism. Since the aspherical lenses have diameters smaller than those of aspherical lenses as the front and the rear lens, and the lenses in the vicinity of the front and the rear lens may be formed of inexpensive materials, the projection zoom lens can be manufactured at low costs.

Since the second lens group 20 includes the first lens subgroup 20a and the second lens subgroup 20b which are individually movable relative to each other, the first lens subgroup 20a has the 2nd-group 1st positive lens 21, and the second lens subgroup 20b has the 2nd-group 2nd positive lens 22, the 2nd-group 1st compound lens 25 and the 2nd-group 3rd positive lens 24, the requisite condition: $0.5<|f1/f2AB|<2.0$ can be satisfied without difficulty, the 2nd-group 3rd positive lens 24 and the 3rd-group 1st meniscus lens 31 can be disposed at the positions in the vicinity of the aperture position without difficulty, and formation of flare spots liable to be formed when the aperture is increased can be suppressed.

As apparent form the foregoing description, the projection zoom lens according to the present invention has simple construction consisting of a small number of lenses, such as twelve or thirteen lenses, is capable of satisfactorily reducing aberrations, and has a large half field angle of about 29°.

The first to the third embodiments mentioned above may be employed as a zoom lens of the projector which comprises an image forming device. Such image forming device may be a light modulation device such as a liquid crystal display or a device composed of, for example, micro mirrors, a film or a slide.

Although the invention has been described in its preferred embodiments with a certain degree of particularity, obviously many changes and variations are possible therein without departing from the scope and spirit of the invention.

What is claimed is:

1. A projection zoom lens comprising a first lens group having a negative refracting power, a second lens group having a positive refracting power, a third lens group having a negative refracting power, and a fourth lens group having a positive refracting power;

wherein the first, the second, the third and the fourth lens groups are arranged in that order from a screen side toward an image plane side along an optical axis;

the first and the fourth lens groups are kept stationary, and the second and the third lens groups are moved along the optical axis to vary power from a limit wide angle power toward a limit telephoto power;

the second lens group includes a 2nd-group 1st positive lens, a 2nd-group 1st compound lens formed by joining a 2nd-group 2nd positive lens having a convex surface on the image plane side and a 2nd-group 1st negative lens having a concave surface on the screen side, and a 2nd-group 3rd positive lens arranged in that order from the screen side toward the image plane side;

the third lens group includes a 3rd-group 1st meniscus lens having a concave surface on the image plane, a 3rd-group 1st compound lens formed by joining a 3rd-group 1st negative lens having opposite concave surfaces and a 3rd-group 1st positive lens having opposite convex surfaces, and a 3rd-group 2nd meniscus lens having a convex surface on the image plane side arranged in that order from the screen side toward the image plane side;

the first lens group has a focal length f1, the 2nd-group 1st positive lens and the 2nd-group 1st compound lens have a composite focal length f2AB of a sign opposite to that of the focal length f1, and the focal length f1 and the composite focal length f2AB meet an inequality:

$$0.5<|f1/f2AB|<2.0.$$

2. The projection zoom lens according to claim 1, wherein distance d between one surface on the side of the image plane of the 2nd-group 3rd positive lens and one surface on the side of the screen of the 3rd-group 1st meniscus lens varies between a value dW for the limit wide angle power and a value dT for the limit telephoto power, and the values dW and dT satisfy an inequality:

$$2.0<dT/dW<4.0.$$

3. The projection zoom lens according to claim 1, wherein the 2nd-group 3rd positive lens and the 3rd-group 1st meniscus lens are disposed at positions in the vicinity of an aperture position where a principal ray emerging from an image plane intersects the optical axis.

4. The projection zoom lens according to claim 1, wherein the 3rd-group 1st meniscus lens is an aspherical lens.

5. The projection zoom lens according to claim 1, wherein all the lenses are spherical lenses.

6. The projection zoom lens according to claim 1, wherein the second lens group includes a first lens subgroup and a second lens subgroup arranged in that order from the screen side toward the image plane side, the first lens subgroup has the 2nd-group 1st positive lens, and the second lens subgroup has the 2nd-group 1st compound lens and the 2nd-group 3rd positive lens.

7. The projection zoom lens according to claim 2, wherein |f1/f2AB| is approximately 0.94 and dT/dW is approximately 3.3.

8. The projection zoom lens according to claim 2, wherein |f1/f2AB| is approximately 1.0 and dT/dW is approximately 3.1.

9. The projection zoom lens according to claim 2, wherein |f1/f2AB| is approximately 0.73 and dT/dW is approximately 2.7.

10. The projection zoom lens according to claim 1, wherein overall focal length is variable between approximately 28 mm for the limit wide angle power and a value between 37 mm and 38 mm for the limit telephoto power.

11. The projection zoom lens according to claim 1, wherein the number of the component lenses is twelve or thirteen.

12. The projection zoom lens according to claim 1, wherein half field angle is approximately 29°.

13. A projector comprising an image forming device for forming an image; and a projection zoom lens for projecting the image, wherein said projector zoom lens is the projector zoom lens according to claim 1.

14. A projector comprising an image forming device for forming an image; and a projection zoom lens for projecting the image, wherein said projector zoom lens is the projector zoom lens according to claim 2.

15. A projector comprising an image forming device for forming an image; and a projection zoom lens for projecting the image, wherein said projector zoom lens is the projector zoom lens according to claim 3.

16. A projector comprising an image forming device for forming an image; and a projection zoom lens for projecting the image, wherein said projector zoom lens is the projector zoom lens according to claim 4.

17. A projector comprising an image forming device for forming an image; and a projection zoom lens for projecting the image, wherein said projector zoom lens is the projector zoom lens according to claim 5.

18. A projector comprising an image forming device for forming an image; and a projection zoom lens for projecting the image, wherein said projector zoom lens is the projector zoom lens according to claim 6.

19. A projector comprising an image forming device for forming an image; and a projection zoom lens for projecting the image, wherein said projector zoom lens is the projector zoom lens according to claim 7.

20. A projector comprising an image forming device for forming an image; and a projection zoom lens for projecting the image, wherein said projector zoom lens is the projector zoom lens according to claim 8.

21. A projector comprising an image forming device for forming an image; and a projection zoom lens for projecting the image, wherein said projector zoom lens is the projector zoom lens according to claim 9.

22. A projector comprising an image forming device for forming an image; and a projection zoom lens for projecting the image, wherein said projector zoom lens is the projector zoom lens according to claim 10.

23. A projector comprising an image forming device for forming an image; and a projection zoom lens for projecting the image, wherein said projector zoom lens is the projector zoom lens according to claim 11.

24. A projector comprising an image forming device for forming an image; and a projection zoom lens for projecting the image, wherein said projector zoom lens is the projector zoom lens according to claim 12.

* * * * *